US012686821B2

(12) United States Patent
Zheng et al.

(10) Patent No.: US 12,686,821 B2
(45) Date of Patent: Jul. 21, 2026

(54) TWIST-BEND NEMATIC LIQUID CRYSTAL (LC) DIMER-BASED MATERIAL AND USE THEREOF, AND LC-BASED CHOLESTERIC HELICONICAL (CH) MATERIAL AND USE THEREOF

(71) Applicant: East China University of Science and Technology, Shanghai (CN)

(72) Inventors: Zhigang Zheng, Shanghai (CN); Conglong Yuan, Shanghai (CN); Jiajun Chen, Shanghai (CN); Yuxing Zhan, Shanghai (CN); Huixian Liu, Shanghai (CN)

(73) Assignee: EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 0 days.

(21) Appl. No.: 18/579,713

(22) PCT Filed: Oct. 13, 2023

(86) PCT No.: PCT/CN2023/124384

§ 371 (c)(1),
(2) Date: Jan. 16, 2024

(87) PCT Pub. No.: WO2025/020309

PCT Pub. Date: Jan. 30, 2025

(65) Prior Publication Data

US 2025/0043182 A1 Feb. 6, 2025

(30) Foreign Application Priority Data

Jul. 24, 2023 (CN) ......................... 202310908652.4
Jul. 24, 2023 (CN) ......................... 202310908656.2

(51) Int. Cl.
*G02F 1/1333* (2006.01)
*C09K 19/02* (2006.01)
*C09K 19/12* (2006.01)
*C09K 19/20* (2006.01)

(52) U.S. Cl.
CPC .......... *C09K 19/12* (2013.01); *C09K 19/0208* (2013.01); *C09K 2019/122* (2013.01); *C09K 2019/2035* (2013.01)

(58) Field of Classification Search
CPC .... C09K 19/12; C09K 19/0208; G02F 1/1333
See application file for complete search history.

(56) References Cited

U.S. PATENT DOCUMENTS 9,732,277 B2 * 8/2017 Lavrentovich ...... G02F 1/13718
2021/0116776 A1 * 4/2021 Jiang .......................... G02F 1/29
2021/0198575 A1 * 7/2021 Zhang ................ C09K 19/2007
2023/0205030 A1 * 6/2023 Zhang .................... C09K 19/14
349/33

FOREIGN PATENT DOCUMENTS

WO WO 87/01822 * 3/1987 ............... G02F 1/13

OTHER PUBLICATIONS

Kumar, "Dependency of the twist-bend nematic phase formation on the molecular shape of liquid crystal dimers: A view through the lens of DFT", Mar. 3, 2022, Journal of Molecular Liquids, vol. 354, 118858 (Year: 2022).*
Paterson et al., "Cyanobiphenyl-based liquid crystal dimers and the twist-bend nematic phase", Apr. 5, 2017, Liquid Crystals, vol. 44, No. 1, pp. 127-146. (Year: 2017).*
Mandel et al. et al., "The Dependency of Nematic and Twist-bend Mesophase Formation on Bend Angle", Nov. 7, 2016, Scientific Reports, vol. 6, 36682. (Year: 2016).*
Yuan et al., "Hyper-stable filed-simulated soft cholesteric heliconical architectures", Oct. 4, 2023, Matter 6, pp. 3555-3573. (Year: 2023).*

* cited by examiner

*Primary Examiner* — Geraldina Visconti
(74) *Attorney, Agent, or Firm* — Thomas Horstemeyer, LLP

(57) ABSTRACT

Provided are a twist-bend nematic ($N_{TB}$) LC dimer-based material and use thereof, and an LC-based cholesteric heliconical (CH) material and use thereof. The $N_{TB}$ LC dimer-based material is at least one selected from the group consisting of CBnCB, CBnOCB, and CBOnOCB, with n being a positive integer of 3 to 15. Based on ultra-stable properties of the material, the disclosure further provides the LC-based CH material, which uses the LC dimer-based material as a key raw material and integrates a conventional nematic LC monomer material and a chiral molecule.

18 Claims, 11 Drawing Sheets

CB7CB $N_{TB}$ - 104 °C - N - 117 °C - Iso

CB9CB $N_{TB}$ - 108 °C - N - 124 °C - Iso

CB11CB

$N_{TB}$ - 109 °C - N - 126 °C - Iso

Initial state

Sample 4

Day 5

Sample 5

Day 17

Sample 6

Day 1

Sample 7

Day 300

Sample 8

Day 300

TWIST-BEND NEMATIC LIQUID CRYSTAL (LC) DIMER-BASED MATERIAL AND USE THEREOF, AND LC-BASED CHOLESTERIC HELICONICAL (CH) MATERIAL AND USE THEREOF

CROSS REFERENCE TO RELATED APPLICATION

This application is a national stage application of International Patent Application No. PCT/CN2023/124384, filed on Oct. 13, 2023, which claims priorities of the Chinese Patent Application No. CN202310908656.2, filed with China National Intellectual Property Administration on Jul. 24, 2023, and the Chinese Patent Application No. CN202310908652.4, filed with China National Intellectual Property Administration on Jul. 24, 2023. The disclosure of the three applications is incorporated by references in their entireties.

TECHNICAL FIELD

The present disclosure belongs to the technical field of liquid crystal (LC) materials, and specifically relates to a twist-bend nematic LC dimer-based material and use thereof, and an LC-based cholesteric heliconical (CH) material and use thereof.

BACKGROUND

Twist-bend nematic ($N_{TB}$) liquid crystal (LC) is a new type of nematic LC materials discovered in the past decade, and is composed of bent LC dimer molecules. This material has a nanoscale periodic heliconical structure and is a photonic material with a broad application potential. $N_{TB}$ LC materials have the advantages of high response speed, wide viewing angle, low voltage driving, and low power consumption, thus showing broad application prospects in the fields of LC displays, optical communications, laser modulators, and biosensors.

Research on the $N_{TB}$ LC materials began in 2010, and the $N_{TB}$ phase was discovered in various bent LC dimer compounds containing flexible methylene spacers, such as 1,7-bis(4-cyanobiphenyl-4-yl) heptane (CB7CB). An LC dimer-based material that constitutes an $N_{TB}$ LC phase has an extremely-low bending elastic constant $K_{33}$, which is highly different from that of conventional long rod-shaped LC materials. In recent years, the $N_{TB}$ LC materials have received increasing attention, involving material synthesis, property characterization, theoretical simulation, and applications. A temperature range of the $N_{TB}$ LC phase is closely related to its chemical structure. Typically, this phase only exists at relatively high temperatures with a narrower temperature range, greatly limiting its application in device fabrication. Ideally, this phase needs to be stable at ambient temperature.

At present, there are opportunities to reduce the temperature range of the $N_{TB}$ phase by designing specific molecular structures, such as introducing S bond(s) and introducing pyrene-based functional group(s) into the molecular structure. Alternatively, a vitrified $N_{TB}$ can be formed through a rapid cooling process. However, although the above methods can achieve an $N_{TB}$ phase at low temperature or ambient temperature, this state is extremely unstable and may crystallize after a few hours of storage, and still cannot realize practical applications.

Through specific molecular structure design, such as functional modification on the structure of LC dimer, introduction of some specific functional groups such as sulfur bonds and pyrene, and changing a structural symmetry of the LC dimer molecule, the temperature range of the $N_{TB}$ phase is optimized to obtain an $N_{TB}$ phase with a relatively broad temperature range, and even the $N_{TB}$ phase can be achieved at ambient temperature. However, the above molecular design scheme mainly faces the following three problems. First, although current materials can reach low temperature or ambient temperature, the above material system of $N_{TB}$ phase is extremely unstable, and crystallization can occur after a sample is stored for a few hours or days. Second, the scheme has difficulties in molecular design, long chemical synthesis cycle, and high difficulty in purification. Third, there is a high uncertainty of the molecular design, making it impossible to obtain a synthesized molecule with a satisfactory $N_{TB}$ phase, and even the synthesized molecules cannot form an $N_{TB}$ phase.

A vitrified $N_{TB}$ phase can be obtained through some specific processes such as rapid liquid nitrogen refrigeration or specific LC dimer molecular design. Depending on the molecular structure, a glass transition temperature of the LC dimer can be at an extremely-low temperature approximately to 0° C. or above ambient temperature. Still, this vitrified $N_{TB}$ phase is also extremely unstable, manifesting in two aspects. On one hand, this phase cannot respond normally to an external electric field. Moreover, once an electric field is applied to the phase or a large temperature change occurs, this vitrified $N_{TB}$ phase may undergo structural collapse and then crystallization begins from the $N_{TB}$ LC phase. On the other hand, this $N_{TB}$ phase at ambient temperature is still not stable for a long time, and the crystallization can occur after a few days of storage.

One of the prominent application scenarios of $N_{TB}$ LC materials is the construction of an LC-based cholesteric heliconical (CH) structure. This is an extremely promising photonic superstructure that has attracted great attention in recent years due to its wide dynamic range reflection band modulation performance driven by low electric fields. CH structure is a special chiral nematic LC state. When a material system meets an abnormally low bending elastic constant ($K_{33}$<1 pN), the CH structure can be constructed with the help of an external electric field. Distinguished from the conventional cholesteric helical structure, where the LC molecules are helical arrangement and at an right-angle to the helical direction, in the CH structure, LC molecules spontaneously and helically arrange to form a one-dimensional periodic heliconical structure along a direction of the electric field, and this structure forms a specific oblique angle θ with a direction of the heliconical axis, where a pitch of the heliconical structure is called a pitch P. This special molecular assembly behavior enables the oblique angle θ and pitch P in the CH structure to achieve a wide range of reversible modulation according to changes in electric field intensity, thus manifesting as spectral modulation within a wide dynamic range controlled by low electric fields. This spectral modulation range can start from a near-ultraviolet band, cover an entire visible light band, and then extend to a near-infrared band, with a total spectral modulation range of not less than 600 nm. Moreover, this electric field modulation behavior has almost no spectral distortion. In comparison, the electric field modulation behavior of traditional cholesteric right-angle helical structures generally face bottlenecks such as narrow spectral modulation range (<50 nm), high driving voltage, and spectral distortion. Accordingly, the unique electric field modulation of the CH structure has also inspired a series of innovative photonic technologies based on the CH structure, including spectral filtering, tunable laser microcavities, information encryption, nonlinear optics, and dynamically-adjustable planar optics applications.

Currently, the most significant issue facing the CH structure in promoting industrial applications is the crystallization instability of a material system based on the CH structure at ambient temperature. The material system of the CH structure generally includes three parts: 1) a most necessary LC dimer-based material for providing an ultra-low bending elastic constant necessary to build the CH; 2) a conventional nematic LC material for further modifying physical parameters of the material system such as a cholesteric phase temperature range, optical and dielectric anisotropy; and 3) a chiral additive for providing an initial chiral environment and a helical twisting power (HTP).

The LC dimer-based material with an $N_{TB}$ phase has an ultra-low bending elastic constant due to its unique molecular configuration, and serves as a necessary condition for the formation of CH. However, the LC dimer-based material has a nematic phase that generally shows an extremely high temperature range and an extremely narrow temperature domain. For example, the most typical LC dimer-based material, CB7CB, has a nematic phase that exists at 104° C. to 117° C., which greatly limits its application scenarios. The nematic temperature of the LC dimer-based material can be reduced while the phase range can be broadened through molecular design. However, there is still a long way to go before reaching ambient temperature. Meanwhile, the molecular design always has long research and development cycles as well as high research and development risks, and faces difficulties in the design, synthesis, and purification of novel molecules. In addition, a traditional nematic LC materials (such as 4-cyano-40-pentylbiphenyl (5CB), and E7) can be mixed with the LC dimer-based material to effectively reduce the nematic temperature and broaden the phase range of the material system, thereby covering ambient temperature and maintaining the ultra-low bending elastic constant. Although the LC dimer-based material has an excellent miscibility with the traditional nematic LC materials, the resulting material system is highly unstable at ambient temperature and generally crystallizes within a few hours, leading to structural collapse. This is mainly due to the instability of LC dimer-based materials at low temperatures, and there is still no substantial molecular design or process optimization to solve the above problem.

SUMMARY

In view of the above deficiencies in the prior art, an object of the present disclosure is to provide a twist-bend nematic ($N_{TB}$) liquid crystal (LC) dimer-based material and use thereof, and an LC-based cholesteric heliconical (CH) material and use thereof.

To achieve the above object, the present disclosure provides the following technical solutions:

In a first aspect of the present disclosure, provided is an ambient-temperature stable non-crystalline $N_{TB}$ LC dimer-based material, being at least one selected from the group consisting of CBnCB, CBnOCB, and CBOnOCB, with n independently being positive integer of 3 to 15, such as 3, 4, 5, 6, 7, 8, 9, 10, 11, or 12, where the CBnCB has a structure as follows:

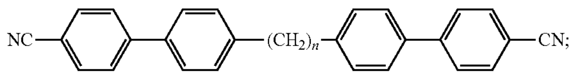

the CBnOCB has a structure as follows:

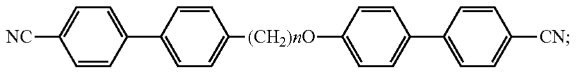

and the CBOnOCB has a structure as follows:

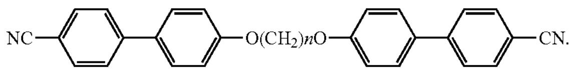

In some embodiments, the ambient-temperature stable non-crystalline $N_{TB}$ LC dimer-based material consists of the following components by mass percentage: 30% to 75% of CB7CB, 15% to 45% of CB9CB, and 5% to 25% of CB11CB; where the CB7CB has a structure as follows:

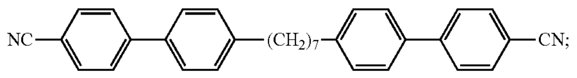

the CB9CB has a structure as follows:

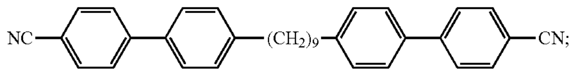

and the CB11CB has a structure as follows:

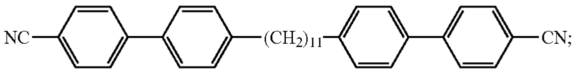

In some embodiments, the ambient-temperature stable non-crystalline $N_{TB}$ LC dimer-based material consists of the following components by mass percentage: 40% to 60% of CB7CB, 20% to 40% of CB9CB, and 10% to 20% of CB11CB.

In some embodiments, the ambient-temperature stable non-crystalline $N_{TB}$ LC dimer-based material consists of the following components by mass percentage: 60% of the CB7CB, 20% of the CB9CB, and 20% of the CB11CB; alternatively, the ambient-temperature stable non-crystalline $N_{TB}$ LC dimer-based material consists of the following components by mass percentage: 40% of the CB7CB, 40% of the CB9CB, and 20% of the CB11CB.

In some embodiments, the ambient-temperature stable non-crystalline $N_{TB}$ LC dimer-based material consists of the following components by mass percentage: 50% of the CB7CB, 35% of the CB9CB, and 15% of the CB11CB; alternatively, the ambient-temperature stable non-crystalline $N_{TB}$ LC dimer-based material consists of the following components by mass percentage: 55% of the CB7CB, 30% of the CB9CB, and 15% of the CB11CB.

In a second aspect of the present disclosure, provided is an ambient-temperature stable non-crystalline LC-based CH material, consisting of the following components by mass percentage: 35% to 55% of an LC dimer-based material, 40% to 60% of a nematic LC monomer material, and 0.1% to 10% of a chiral molecule; where the LC dimer-based material is CBnCB, with n being a positive integer of 3 to 15, such as 3, 4, 5, 6, 7, 8, 9, 10, 11, or 12, and the CBnCB, and the CBnCB has a structure as follows:

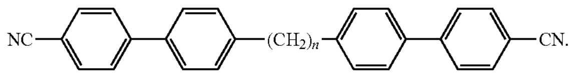

In some embodiments, the nematic LC monomer material is selected from the group consisting of 5CB, 8CB, 7OCB, E7, TEB300, SLC1717, SLC9023, and HTD028200-200, where the 5CB has a structure as follows:

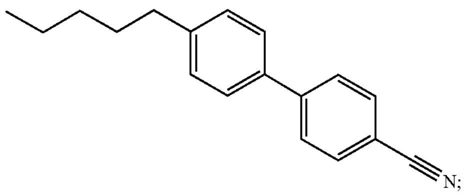 [SMILES: CCCCCc1ccc(-c2ccc(C#N)cc2)cc1]

the 8CB has a structure as follows:

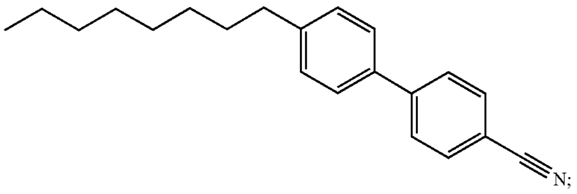 [SMILES: CCCCCCCCc1ccc(-c2ccc(C#N)cc2)cc1]

the 7OCB has a structure as follows:

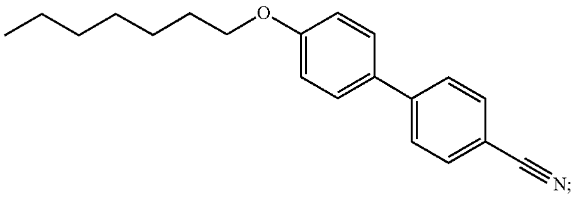 [SMILES: CCCCCCCOc1ccc(-c2ccc(C#N)cc2)cc1]

the E7 is purchased from companies such as Jiangsu Hecheng Advanced Materials Co., Ltd, China, Shijiazhuang Slichem Display Material Co., Ltd, China, Yantai Xianhua Technology Group Co., Ltd, China and Merck, Germany; the TEB300, the SLC1717, and the SLC9023 are purchased from Shijiazhuang Slichem Display Material Co., Ltd, China; and the HTD028200-200 is purchased from Jiangsu Hecheng Advanced Materials Co., Ltd, China.

In some embodiments, the chiral molecule is selected from the group consisting of CB15, R811, S811, R2011, S2011, R1011, S1011, R5011, and S5011.

In some embodiments, the CB15 has a structure as follows:

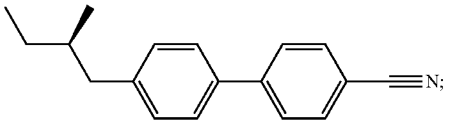 [SMILES: CC[C@@H](C)Cc1ccc(-c2ccc(C#N)cc2)cc1]

the R811 has a structure as follows:

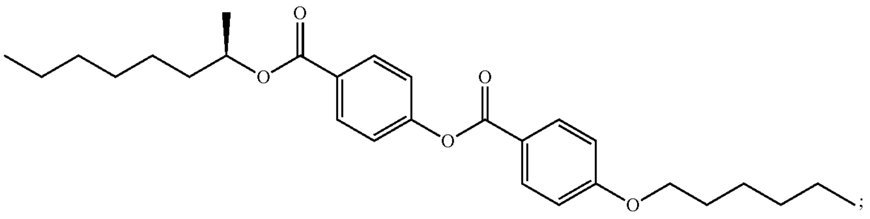 [SMILES: CCCCCCOc1ccc(C(=O)Oc2ccc(C(=O)O[C@H](C)CCCCCC)cc2)cc1]

the S811 has a structure as follows:
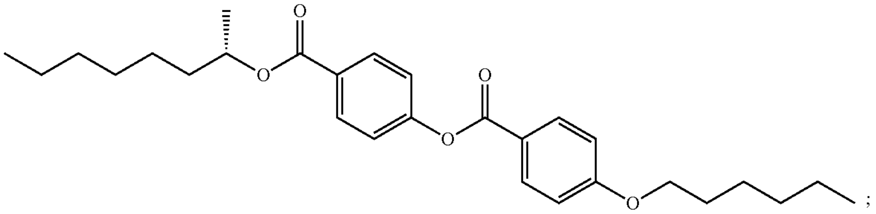 [SMILES: CCCCCCOc1ccc(C(=O)Oc2ccc(C(=O)O[C@@H](C)CCCCCC)cc2)cc1]
the R1011 has a structure as follows:
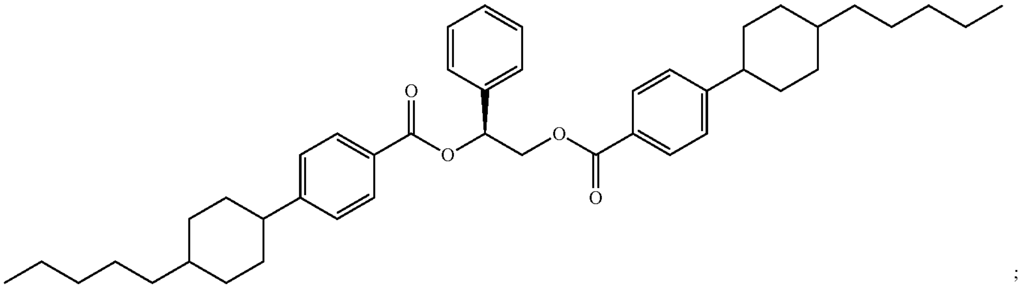 [SMILES: CCCCCC1CCC(c2ccc(C(=O)OC[C@@H](OC(=O)c3ccc(C4CCC(CCCCC)CC4)cc3)c3ccccc3)cc2)CC1]
the S1011 has a structure as follows:
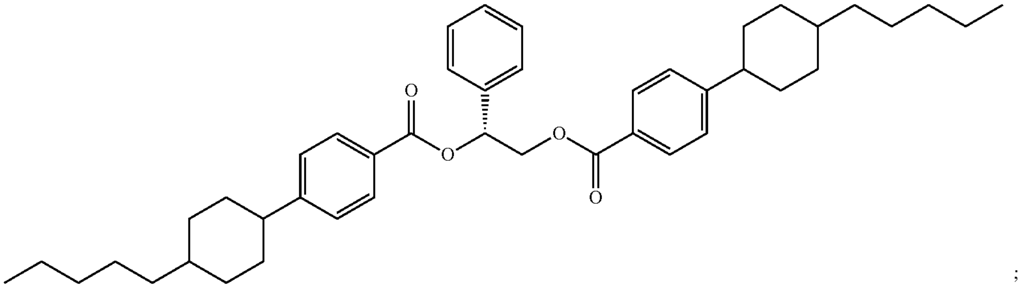 [SMILES: CCCCCC1CCC(c2ccc(C(=O)OC[C@H](OC(=O)c3ccc(C4CCC(CCCCC)CC4)cc3)c3ccccc3)cc2)CC1]
the R2011 has a structure as follows:
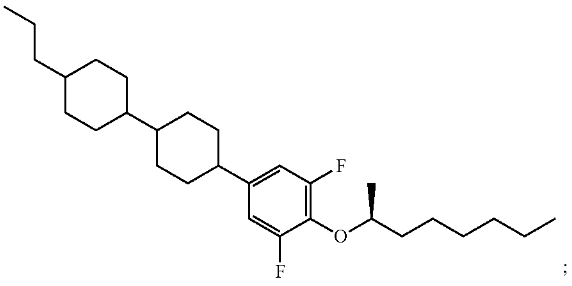 [SMILES: CCCCCC[C@H](C)Oc1c(F)cc(C2CCC(C3CCC(CCC)CC3)CC2)cc1F]
the S2011 has a structure as follows:
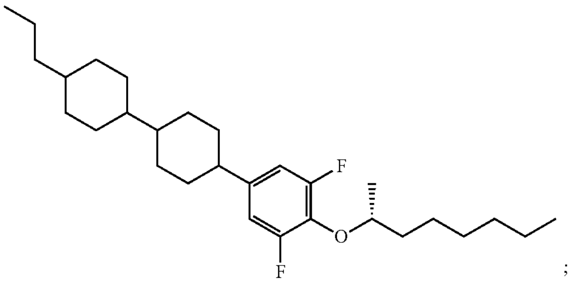 [SMILES: CCCCCC[C@@H](C)Oc1c(F)cc(C2CCC(C3CCC(CCC)CC3)CC2)cc1F]

the R5011 has a structure as follows:

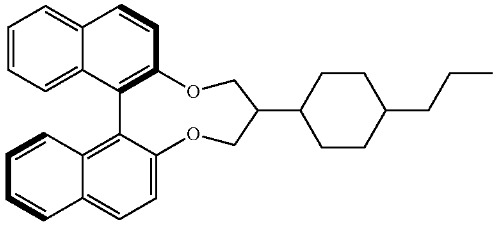

;

the S5011 has a structure as follows; and

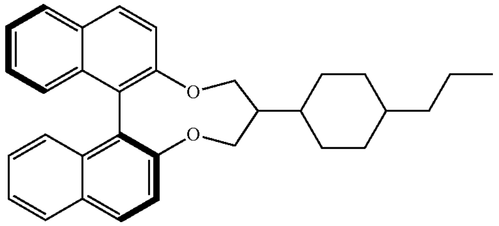

.

The chiral molecule is purchased commercially, and suppliers can be selected from companies such as Jiangsu Hecheng Advanced Materials Co., Ltd, China, Shijiazhuang Slichem Display Material Co., Ltd, China, Yantai Xianhua Technology Group Co., Ltd, China, and Merck Germany.

In some embodiments, the LC dimer-based material consists of the following components by mass percentage: 30% to 75% of the CB7CB, 15% to 45% of the CB9CB, and 5% to 25% of the CB11CB; where the CB7CB has a structure as follows:

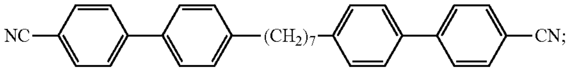

the CB9CB has a structure as follows:

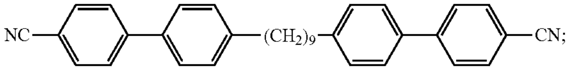

the CB11CB has a structure as follows:

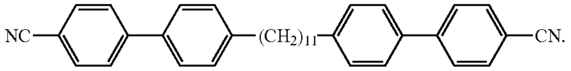

In some embodiments, the ambient-temperature stable non-crystalline LC-based CH material consists of the following components by mass percentage: 40% to 50% of the LC dimer-based material, 45% to 55% of the nematic LC monomer material, and 1% to 5% of the chiral molecule.

In some embodiments, the ambient-temperature stable non-crystalline LC-based CH material consists of the following components by mass percentage: 45% of the LC dimer-based material, 52% of the nematic LC monomer material, and 3% of the chiral molecule.

In some embodiments, the LC dimer-based material consists of the following components by mass percentage: 40% to 60% of the CB7CB, 20% to 40% of the CB9CB, and 10% to 20% of the CB11CB.

In some embodiments, the LC dimer-based material consists of the following components by mass percentage: 60% of the CB7CB, 20% of the CB9CB, and 20% of the CB11CB; alternatively, the LC dimer-based material consists of the following components by mass percentage: 40% of the CB7CB, 40% of the CB9CB, and 20% of the CB11CB.

In some embodiments, the ambient-temperature stable non-crystalline $N_{TB}$ LC dimer-based material consists of the following components by mass percentage: 50% of the CB7CB, 35% of the CB9CB, and 15% of the CB11CB; alternatively, the ambient-temperature stable non-crystalline $N_{TB}$ LC dimer-based material consists of the following components by mass percentage: 55% of the CB7CB, 30% of the CB9CB, and 15% of the CB11CB.

In the present disclosure, the LC dimer-based material can provide the required ultra-low bending elastic constant and suppress crystallization. The nematic LC monomer material can reduce the nematic temperature range and modify the physical parameters of the material system. The chiral molecule can construct an initial chiral environment to form a chiral nematic phase; based on differences in the helical twisting power (HTP) of chiral molecules and the left and right rotation of chirality, specific chiral molecules can be selected and the content of chiral molecules can be adjusted.

In a third aspect of the present disclosure, provided is use of the ambient-temperature stable non-crystalline $N_{TB}$ LC dimer-based material of any one of the above technical solutions or the ambient-temperature stable non-crystalline LC-based CH material of any one of the above technical solutions in preparation of a display panel and a display device.

By adopting the foregoing technical solutions, the present disclosure achieves the following advantages and beneficial effects.

The present disclosure provides an ambient-temperature stable non-crystalline $N_{TB}$ LC dimer-based material. In the present disclosure, the ambient-temperature stable non-crystalline $N_{TB}$LC dimer-based material has a simple monomer composition and a simple preparation process. By mixing a variety of LC dimer-based materials with different degrees of molecular bending and central flexibility in specific proportions, a supercooling capability of the material system is significantly enhanced with the help of intermolecular interactions and molecular chain entanglement. As a result, a stable, reliable, and non-crystalline $N_{TB}$ phase is achieved at ambient temperature. The material sample maintains an $N_{TB}$ phase region over a wide temperature range without any crystallization for at least 300 days. The present disclosure is of great significance to the development of LC dimer-based materials, the in-depth research on $N_{TB}$ LC phase, and the development in the field of modern photonics.

In the ambient-temperature stable non-crystalline $N_{TB}$ LC dimer-based material of the present disclosure, an overall stability of the material system can be effectively improved according to different dimer component ratios; the ambient-temperature stable non-crystalline $N_{TB}$ LC dimer-based material has an $N_{TB}$ phase over a wide temperature range, from ambient temperature to approximately 100° C.

In the present disclosure, the ambient-temperature stable non-crystalline $N_{TB}$ LC dimer-based material can meet long-term storage requirements. Even if the $N_{TB}$ phase is stored at ambient temperature for not less than 300 days, no crystallization is observed. The material system exhibits an excellent stability, far exceeding that of other material systems.

The present disclosure further provides an ambient-temperature stable non-crystalline LC-based CH material. The ambient-temperature stable non-crystalline LC-based CH material of the present disclosure has an overall chiral nematic temperature range covering the ambient temperature (25° C.). The material system is extremely stable and does not show any crystallization even if it is stored for not less than 1 year at ambient temperature. The material system has an extremely-low bending elastic constant, with $K_{33}$<0.4 pN at ambient temperature. The physical parameters of the material system, including dielectric constant and elastic constant, can remain stable and do not fluctuate with storage. The physical parameters of the material system do not change significantly even after being stored for one year.

In the present disclosure, the ambient-temperature stable non-crystalline LC-based CH material exhibits wide dynamic selective reflection modulation driven by a low electric field (<2 V/μm), and has a reflection band range modulation range from 430 nm to 1,050 nm, exceeding 600 nm. The modulation of the broad spectrum of this electric field still shows an extremely strong stability. After the material system has been stored for one year, the reflection spectral bands corresponding to the electric field intensity almost show a one-to-one correspondence, with no obvious difference.

Currently, existing material systems have a relatively high nematic temperature range, generally not less than 100° C. The nematic temperature range of the ambient-temperature stable non-crystalline LC-based CH material of the present disclosure covers the ambient temperature.

Currently, existing material systems are extremely unstable at ambient temperature and generally crystallize rapidly within a few hours, causing the structure to collapse and completely fail. In the present disclosure, the ambient-temperature stable non-crystalline LC-based CH material is extremely stable, and no crystallization occurs even if it is stored at ambient temperature for not less than 1 year.

In the ambient-temperature stable non-crystalline LC-based CH material of the present disclosure, a variety of relatively conventional LC dimers CB7CB, CB9CB, CB11CB and other homologues are mixed in specific proportions. In this way, through a synergy between molecules and the complexity of molecular conformation caused by an entanglement effect of molecular chains, the stability of the material system is effectively improved, thereby inhibiting crystallization.

The present disclosure further provides use of the ambient-temperature stable non-crystalline $N_{TB}$ LC dimer-based material of the above technical solution or the ambient-temperature stable non-crystalline LC-based CH material of the above technical solution in preparation of a display panel and a display device. The present disclosure solves the bottleneck problem that has limited the application of CH structures for a long time, and is a key technological breakthrough that promotes engineering and even mass production of CH structures.

BRIEF DESCRIPTION OF THE DRAWINGS

To describe the technical solutions in embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

DETAILED DESCRIPTION OF THE EMBODIMENTS

Figure 1A:
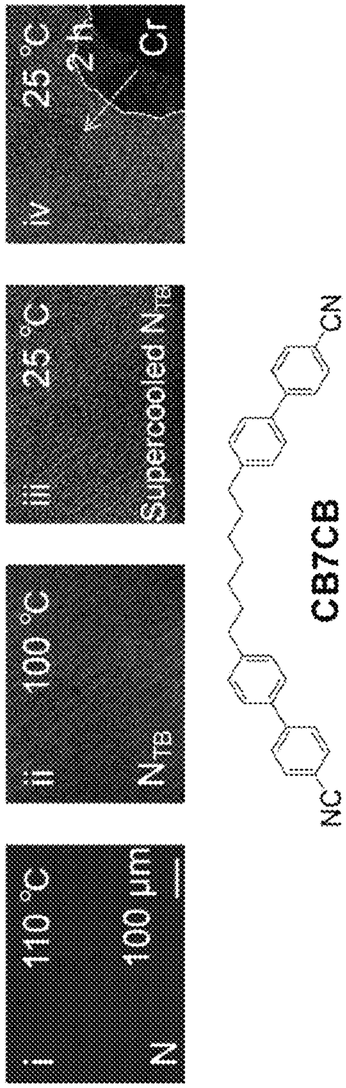
FIG. 1A shows the molecular structures of LC dimer CB7CB and its polarized optical textures and phase states during cooling.

In order to further illustrate the present disclosure, the applicant will further describe the technical solution of the present disclosure in detail below with reference to the accompanying drawings and specific examples, such that those skilled in the art can clearly understand the present disclosure. However, the following examples should not be construed to limit the scope of the claims of the present disclosure to any extent.

In the examples of the present disclosure, preparation methods of the CBnCB, the CBnOCB, and the CBOnOCB can be found in the literature: *Liq. Cryst.*, 2017, 44, 127-146, which is incorporated herein by reference.

In the examples of the present disclosure, the reagents used were as follows:

1,5-bis 4-(4'-cyanobiphenyl)pentane (CB5CB), with a molecular formula:

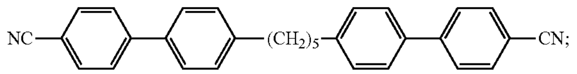

1,7-bis 4-(4'-cyanobiphenyl)heptane (CB7CB), with a molecular formula:

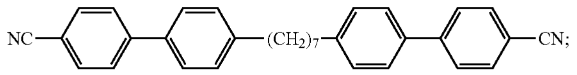

1,9-bis 4-(4'-cyanobiphenyl)nonane (CB9CB), with a molecular formula:

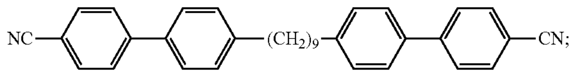

1,11-bis 4-(4'-cyanobiphenyl)undecane (CB11CB), with a molecular formula:

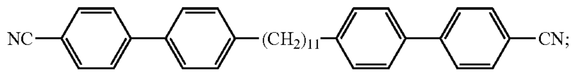

1-(4-cyanobiphenyl-4'-oxy)-4-(4-cyanobiphenyl-4'-yl) hexane (CB40CB), with a molecular formula:

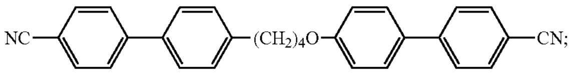

1-(4-cyanobiphenyl-4'-oxy)-6-(4-cyanobiphenyl-4'-yl) hexane (CB60CB), with a molecular formula:

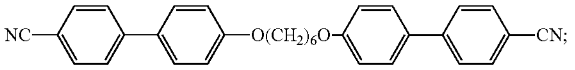

1,3-bis(4-cyanobiphenyl-4'-oxy)alkane (CB030CB), with a molecular formula:

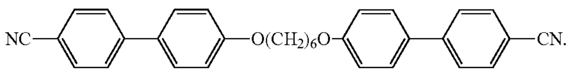

The CBnCB material was synthesized according to a synthesis route as follows:

Adipoyl chloride and 4-bromobiphenyl were added dropwise to a suspension of aluminum trichloride/dichloromethane and stirred, and a resulting reaction mixture was added into water and shaken to be uniform with dichloromethane. A remaining aqueous suspension was filtered, an obtained solid was washed thoroughly with water and recrystallized from toluene. Triethylsilane was added dropwise to α,ω-bis (4'-bromobiphenyl-4-yl)butane and stirred in a solution of trifluoroacetic acid and dichloromethane. A resulting reaction mixture was left to reach ambient temperature and stirred for 48 h, then a resulting white solid was filtered off, washed with water and recrystallized from toluene. A mixture of α,ω-bis(4'-bromobiphenyl-4-yl)hexane, cuprous cyanide, and dry N-methylpyrrolidone was stirred at 200° C. for 4 h, and then cooled to 80° C., and added with ferric chloride and hydrochloric acid. A resulting mixture was stirred for another 30 min, cooled overnight, added with water, and shaken to be uniform with dichloromethane. A resulting organic layer was washed with water, dried over $CaCl_2$ and the solvent was removed, and the remaining product was finally recrystallized from toluene.

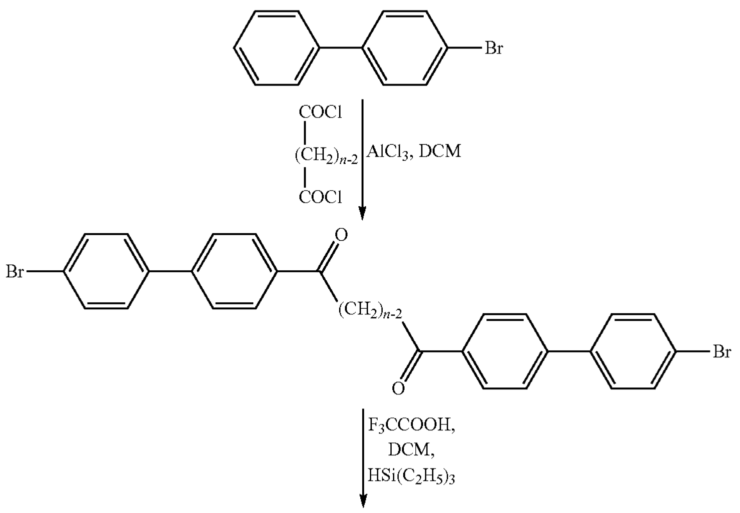

-continued

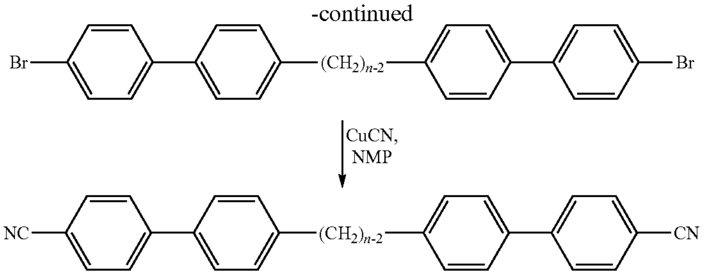

Example 1

An ambient-temperature stable non-crystalline $N_{TB}$ LC dimer-based material consisted of the following components by mass percentage: 60% of CB7CB, 20% of CB9CB, and 20% of CB11CB, and was named sample S7.

During determination, each of the above components was weighed according to the above ratio, stirred evenly for 2 h at 130° C., and mixed evenly to obtain a product, which was then subjected to determination. The following examples and comparative examples were all conducted according to this method.

Example 2

An ambient-temperature stable non-crystalline $N_{TB}$ LC dimer-based material consisted of the following components by mass percentage: 40% of CB7CB, 40% of CB9CB, and 20% of CB11CB, and was named sample S8.

Example 3

An ambient-temperature stable non-crystalline $N_{TB}$ LC dimer-based material consisted of the following components by mass percentage: 50% of CB7CB, 35% of CB9CB, and 15% of CB11CB, and was named sample S9.

Example 4

An ambient-temperature stable non-crystalline $N_{TB}$ LC dimer-based material consisted of the following components by mass percentage: 55% of CB7CB, 30% of CB9CB, and 15% of CB11CB, and was named sample S10.

Comparative Example 1

A material used CB7CB as a single component and was named sample S1.

Comparative Example 2

A material used CB9CB as a single component and was named sample S2.

Comparative Example 3

A material used CB11CB as a single component and was named sample S3.

Comparative Example 4

An LC material consisted of the following components by mass percentage: 60% of CB7CB and 40% of CB9CB, and was named sample S4.

Comparative Example 5

An LC material consisted of the following components by mass percentage: 60% of CB7CB and 40% of CB11CB, and was named sample S5.

Comparative Example 6

An LC material consisted of the following components by mass percentage: 60% of CB9CB and 40% of CB11CB, and was named sample S6.

Example 5

An ambient-temperature stable non-crystalline LC-based CH material was named sample T-1, and consisted of the following components by mass percentage: 45% of an LC dimer-based material, 52% of a nematic LC monomer material, and 3% of a chiral molecule; where the LC dimer-based material consisted of the following components by mass percentage: 60% of the CB7CB, 20% of the CB9CB, and 20% of the CB11CB, the nematic LC monomer material was 5CB, and the chiral molecule was R811.

Example 6

An ambient-temperature stable non-crystalline LC-based CH material was named sample T-4, and consisted of the following components by mass percentage: 45% of an LC dimer-based material, 52% of a nematic LC monomer material, and 3% of a chiral molecule; where the LC dimer-based material consisted of the following components by mass percentage: 40% of the CB7CB, 40% of the CB9CB, and 20% of the CB11CB, the nematic LC monomer material was 5CB, and the chiral molecule was R811.

Example 7

An ambient-temperature stable non-crystalline LC-based CH material was named sample T-7, and consisted of the following components by mass percentage: 45% of an LC dimer-based material, 52% of a nematic LC monomer material, and 3% of a chiral molecule; where the LC dimer-based material consisted of the following components by mass percentage: 60% of the CB7CB, 20% of the CB9CB, and 20% of the CB11CB, the nematic LC monomer material was E7, and the chiral molecule was R811.

Example 8

An ambient-temperature stable non-crystalline LC-based CH material was named sample T-8, and consisted of the following components by mass percentage: 45% of an LC dimer-based material, 52% of a nematic LC monomer material, and 3% of a chiral molecule; where the LC dimer-based material consisted of the following components by mass percentage: 60% of the CB7CB, 20% of the CB9CB, and 20% of the CB11CB, the nematic LC monomer material was TEB300, and the chiral molecule was R811.

Example 9

An ambient-temperature stable non-crystalline LC-based CH material was named sample T-9, and consisted of the following components by mass percentage: 45% of an LC dimer-based material, 52% of a nematic LC monomer material, and 3% of a chiral molecule; where the LC dimer-based material consisted of the following components by mass percentage: 60% of the CB7CB, 20% of the CB9CB, and 20% of the CB11CB, the nematic LC monomer material was SLC1717, and the chiral molecule was R811.

Example 10

An ambient-temperature stable non-crystalline LC-based CH material was named sample T-10, and consisted of the following components by mass percentage: 45% of an LC dimer-based material, 52% of a nematic LC monomer material, and 3% of a chiral molecule; where the LC dimer-based material consisted of the following components by mass percentage: 60% of the CB7CB, 20% of the CB9CB, and 20% of the CB11CB, the nematic LC monomer material was HTD028200-200, and the chiral molecule was R811.

Example 11

An ambient-temperature stable non-crystalline LC-based CH material was named sample T-11, and consisted of the following components by mass percentage: 45% of an LC dimer-based material, 52% of a nematic LC monomer material, and 3% of a chiral molecule; where the LC dimer-based material consisted of the following components by mass percentage: 60% of the CB7CB, 20% of the CB9CB, and 20% of the CB11CB, the nematic LC monomer material was SLC9023, and the chiral molecule was R811.

Comparative Example 7

A material was named sample S-1, and consisted of the following components by mass percentage: 45% of an LC dimer-based material, 52% of a nematic LC monomer material, and 3% of a chiral molecule; where the LC dimer-based material consisted of the following components by mass percentage: 100% of the CB7CB, 0% of the CB9CB, and 0% of the CB11CB, the nematic LC monomer material was 5CB, and the chiral molecule was R811.

Comparative Example 8

A material was named sample S-2, and consisted of the following components by mass percentage: 45% of an LC dimer-based material, 52% of a nematic LC monomer material, and 3% of a chiral molecule; where the LC dimer-based material consisted of the following components by mass percentage: 0% of the CB7CB, 100% of the CB9CB, and 0% of the CB11CB, the nematic LC monomer material was 5CB, and the chiral molecule was R811.

Comparative Example 9

A material was named sample S-2, and consisted of the following components by mass percentage: 45% of an LC dimer-based material, 52% of a nematic LC monomer material, and 3% of a chiral molecule; where the LC dimer-based material consisted of the following components by mass percentage: 0% of the CB7CB, 0% of the CB9CB, and 100% of the CB11CB, the nematic LC monomer material was 5CB, and the chiral molecule was R811.

Comparative Example 10

A material was named sample D-1, and consisted of the following components by mass percentage: 45% of an LC dimer-based material, 52% of a nematic LC monomer material, and 3% of a chiral molecule; where the LC dimer-based material consisted of the following components by mass percentage: 80% of the CB7CB, 20% of the CB9CB, and 0% of the CB11CB, the nematic LC monomer material was 5CB, and the chiral molecule was R811.

Comparative Example 11

A material was named sample D-2, and consisted of the following components by mass percentage: 45% of an LC dimer-based material, 52% of a nematic LC monomer material, and 3% of a chiral molecule; where the LC dimer-based material consisted of the following components by mass percentage: 80% of the CB7CB, 0% of the CB9CB, and 20% of the CB11CB, the nematic LC monomer material was 5CB, and the chiral molecule was R811.

Comparative Example 12

A material was named sample D-3, and consisted of the following components by mass percentage: 45% of an LC dimer-based material, 52% of a nematic LC monomer material, and 3% of a chiral molecule; where the LC dimer-based material consisted of the following components by mass percentage: 0% of the CB7CB, 80% of the CB9CB, and 20% of the CB11CB, the nematic LC monomer material was 5CB, and the chiral molecule was R811.

Comparative Example 13

A material was named sample D-4, and consisted of the following components by mass percentage: 45% of an LC dimer-based material, 52% of a nematic LC monomer material, and 3% of a chiral molecule; and the LC dimer-based material consisted of the following components by mass percentage: 0% of the CB7CB, 20% of the CB9CB, and 80% of the CB11CB, the nematic LC monomer material was 5CB, and the chiral molecule was R811.

Comparative Example 14

A material was named sample D-5, and consisted of the following components by mass percentage: 45% of an LC dimer-based material, 52% of a nematic LC monomer material, and 3% of a chiral molecule; where the LC dimer-based material consisted of the following components by mass percentage: 20% of the CB7CB, 0% of the CB9CB, and 80% of the CB11CB, the nematic LC monomer material was 5CB, and the chiral molecule was R811.

Comparative Example 15

A material was named sample D-6, and consisted of the following components by mass percentage: 45% of an LC dimer-based material, 52% of a nematic LC monomer material, and 3% of a chiral molecule; where the LC dimer-based material consisted of the following components by mass percentage: 60% of the CB7CB, 40% of the CB9CB, and 0% of the CB11CB, the nematic LC monomer material was 5CB, and the chiral molecule was R811.

Comparative Example 16

A material was named sample D-7, and consisted of the following components by mass percentage: 45% of an LC dimer-based material, 52% of a nematic LC monomer material, and 3% of a chiral molecule; where the LC dimer-based material consisted of the following components by mass percentage: 60% of the CB7CB, 0% of the CB9CB, and 40% of the CB11CB, the nematic LC monomer material was 5CB, and the chiral molecule was R811.

Comparative Example 17

A material was named sample D-8, and consisted of the following components by mass percentage: 45% of an LC dimer-based material, 52% of a nematic LC monomer material, and 3% of a chiral molecule; where the LC dimer-based material consisted of the following components by mass percentage: 0% of the CB7CB, 60% of the CB9CB, and 40% of the CB11CB, the nematic LC monomer material was 5CB, and the chiral molecule was R811.

Comparative Example 18

A material was named sample D-9, and consisted of the following components by mass percentage: 45% of an LC dimer-based material, 52% of a nematic LC monomer material, and 3% of a chiral molecule; where the LC dimer-based material consisted of the following components by mass percentage: 0% of the CB7CB, 40% of the CB9CB, and 60% of the CB11CB, the nematic LC monomer material was 5CB, and the chiral molecule was R811.

Comparative Example 19

A material was named sample D-10, and consisted of the following components by mass percentage: 45% of an LC dimer-based material, 52% of a nematic LC monomer material, and 3% of a chiral molecule; where the LC dimer-based material consisted of the following components by mass percentage: 40% of the CB7CB, 60% of the CB9CB, and 0% of the CB11CB, the nematic LC monomer material was 5CB, and the chiral molecule was R811.

Comparative Example 20

A material was named sample D-11, and consisted of the following components by mass percentage: 45% of an LC dimer-based material, 52% of a nematic LC monomer material, and 3% of a chiral molecule; where the LC dimer-based material consisted of the following components by mass percentage: 40% of the CB7CB, 0% of the CB9CB, and 60% of the CB11CB, the nematic LC monomer material was 5CB, and the chiral molecule was R811.

Comparative Example 21

A material was named sample T-2, and consisted of the following components by mass percentage: 45% of an LC dimer-based material, 52% of a nematic LC monomer material, and 3% of a chiral molecule; where the LC dimer-based material consisted of the following components by mass percentage: 20% of the CB7CB, 60% of the CB9CB, and 20% of the CB11CB, the nematic LC monomer material was 5CB, and the chiral molecule was R811.

Comparative Example 22

A material was named sample T-3, and consisted of the following components by mass percentage: 45% of an LC dimer-based material, 52% of a nematic LC monomer material, and 3% of a chiral molecule; and the LC dimer-based material consisted of the following components by mass percentage: 20% of the CB7CB, 20% of the CB9CB, and 60% of the CB11CB, the nematic LC monomer material was 5CB, and the chiral molecule was R811.

Comparative Example 23

A material was named sample T-5, and consisted of the following components by mass percentage: 45% of an LC dimer-based material, 52% of a nematic LC monomer material, and 3% of a chiral molecule; where the LC dimer-based material consisted of the following components by mass percentage: 40% of the CB7CB, 20% of the CB9CB, and 40% of the CB11CB, the nematic LC monomer material was 5CB, and the chiral molecule was R811.

Comparative Example 24

A material was named sample T-6, and consisted of the following components by mass percentage: 45% of an LC dimer-based material, 52% of a nematic LC monomer material, and 3% of a chiral molecule; where the LC dimer-based material consisted of the following components by mass percentage: 20% of the CB7CB, 40% of the CB9CB, and 40% of the CB11CB, the nematic LC monomer material was 5CB.

the chiral molecule was R811.

Comparative Example 25

An ambient-temperature stable non-crystalline LC-based CH material was named sample T-12, and consisted of the following components by mass percentage: 45% of an LC dimer-based material, 52% of a nematic LC monomer material, and 3% of a chiral molecule; where the LC dimer-based material consisted of the following components by mass percentage: 80% of the CB7CB, 10% of the CB9CB, and 10% of the CB11CB, the nematic LC monomer material was 5CB, and the chiral molecule was R811.

Figure 1B:
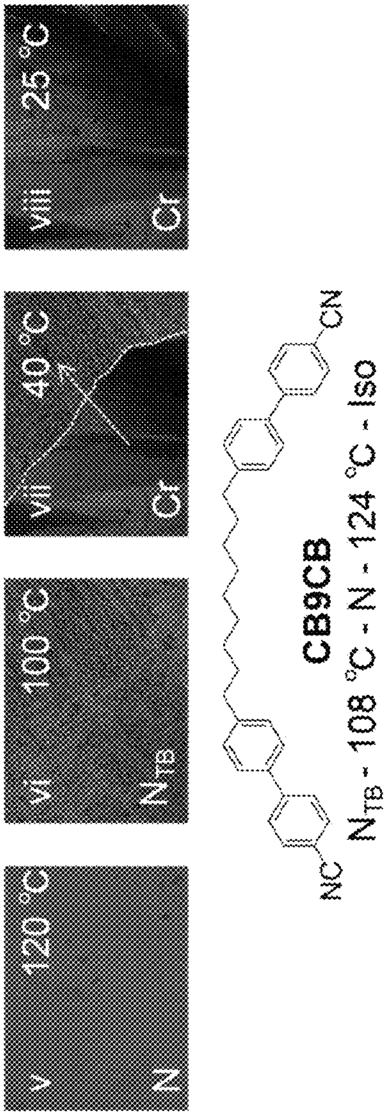
FIG. 1B shows the molecular structures of LC dimer CB9CB and its polarized optical textures and phase states during cooling.
Figure 1C:
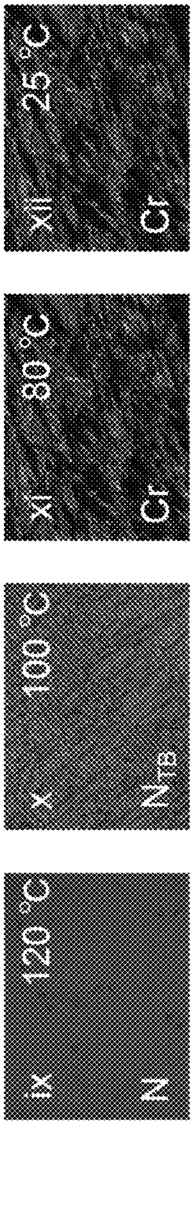
FIG. 1C shows the molecular structures of LC dimer CB11CB and its polarized optical textures and phase states during cooling.
Figure 1C:
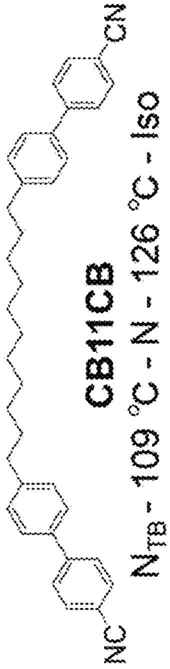

3 groups of samples S1, S2, and S3 were heated to 130° C. to melt into isotropic state. At this temperature, the samples were separately poured into an LC cell (size: 15*18 $mm^2$, thickness 12 μm) with surface parallel alignment direction, and placed in a precision temperature-controlled hot stage. The samples were slowly cooled down at 3° C./min to observe phase transition of the samples. The results are shown in FIGS. 1A-1C. FIGS. 1A-1C show the molecular structures of CB7CB, CB9CB, and CB11CB and their polarized optical textures and phase state during cooling. For the sample S1 CB7CB, as the temperature decreased, it transitioned from the isotropic state to the nematic phase state (N phase) at 117° C., and from the N phase state to the $N_{TB}$ phase state at 104° C. The polarized texture shows a uniform color in the N phase and a rope-like polarized texture in the $N_{TB}$ phase state. As the temperature continued to decrease, the $N_{TB}$ phase state could be maintained until ambient temperature of 25° C., namely supercooling. However, the supercooled $N_{TB}$ was extremely unstable and might crystallize in about 2 h. Similar results are found for the sample S2 CB9CB and sample S3 CB11CB. The sample S2 crystallizes at 40° C., while the sample S3 crystallizes directly at 80° C. Therefore, the above three samples indicate that for general LC dimer-based materials, it was generally impossible to obtain the $N_{TB}$ phase state at ambient temperature, or the $N_{TB}$ phase state was extremely unstable and prone to crystallization.

The three LC dimer-based materials CB7CB, CB9CB, and CB11CB were weighed according to the proportions in samples S4, S5, S6, S7, S8, S9, and S10 and placed in sample bottles for mixing. A magnetic stirrer was added to each sample bottle and the samples were separately stirred evenly at 130° C. for 2 h until mixed to be uniform. At this temperature, the samples were separately poured into an LC cell (size: 15*18 $mm^2$, thickness 12 μm) with surface parallel alignment direction, and placed in a precision temperature-controlled hot stage. The samples were slowly cooled down at 3° C./min to observe phase transition of the samples. The phase transitions of samples S4, S5, S6, S7, and S8 are highly similar to those of samples S1, S2, and S3, that is, they transformed from isotropic state to conventional N phase state at around 120° C., and from N phase state to $N_{TB}$ phase state at around 105° C. The $N_{TB}$ phase state of samples S4, S5, S6, S7, and S8 could all be supercooled to ambient temperature of 25° C.

Figure 2A:
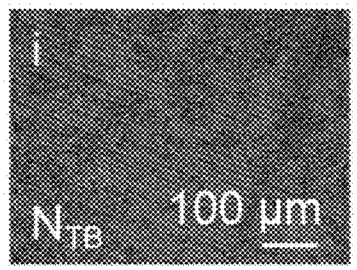
FIG. 2A shows schematic diagrams of the initial state of samples S4, S5, S6, S7, and S8.
Figure 2B:
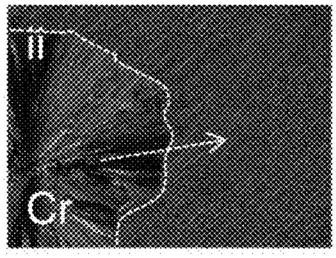
FIG. 2B shows schematic diagrams of the crystallization time of sample S4 after being stored at ambient temperature.
Figure 2C:
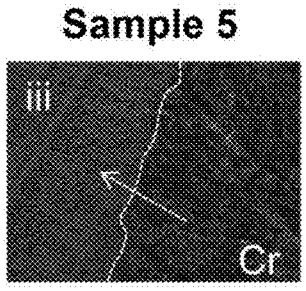
FIG. 2C shows schematic diagrams of the crystallization time of sample S5 after being stored at ambient temperature.
Figure 2D:
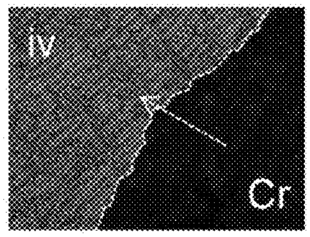
FIG. 2D shows schematic diagrams of the crystallization time of sample S6 after being stored at ambient temperature.
Figure 2E:
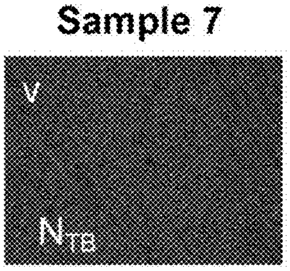
FIG. 2E shows schematic diagrams of the crystallization time of sample S7 after being stored at ambient temperature.
Figure 2F:
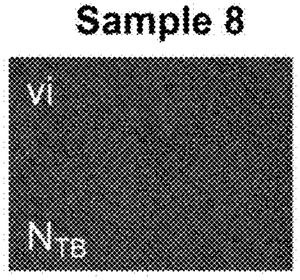
FIG. 2F shows schematic diagrams of the crystallization time of sample S8 after being stored at ambient temperature.

The temperature range and ambient temperature stability of the $N_{TB}$ phase state of the material were characterized by polarized optical microscope (POM) and X-ray diffraction (XRD). The samples S4, S5, S6, S7, and S8 were stored at ambient temperature, and their stability and crystallization were monitored through the POM. The $N_{TB}$ phase state could be confirmed by the images of POM, and the results are shown in FIGS. 2A-2F. FIGS. 2A-2F show a schematic diagram of the crystallization times of samples S4, S5, S6, S7, and S8 after storage at ambient temperature. As could be seen from the figure, FIG. 2A is an initial state of the samples S4 to S8 at ambient temperature, in which the molecules were arranged in a rope-like texture, indicating the $N_{TB}$ phase state. In the initial state, each sample exhibits a supercooled $N_{TB}$ phase state at ambient temperature of 25° C., and POM shows a rope-like texture. However, the crystallization stability of the above samples is closely related to the compositions of the materials. For example, sample S4 crystallizes on the 5th day; sample S5 crystallizes on the 17th day; sample S6 is extremely unstable and might crystallize on the first day. However, samples S7 and S8 show amazing stability, without any crystallization even after being stored for not less than 300 days. The POM images of samples S7 and S8 still remain indistinguishable from the initial state, indicating the extremely strong stability.

Figure 3:
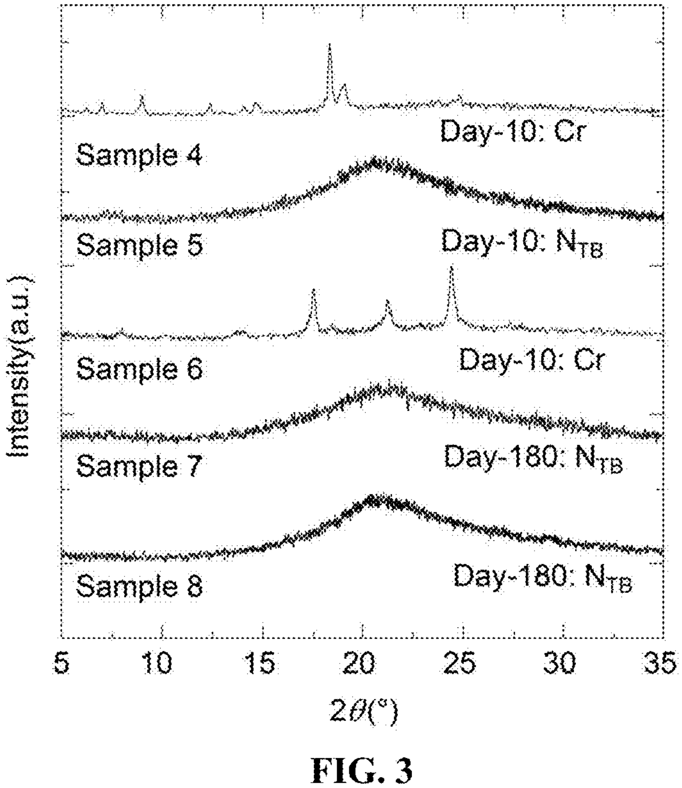
FIG. 3 shows an X-ray diffraction (XRD) curves of samples S4, S5, S6, S7, and S8 after being stored at ambient temperature.

In order to further confirm the stability of the above material system, the above samples S4, S5, S6, S7, and S8 were further analyzed by XRD method. The results are shown in FIG. 3. FIG. 3 shows an XRD pattern of samples S4, S5, S6, S7, and S8 after storage at ambient temperature. The samples were subjected to XRD analysis after being stored for 10 days. At this time, samples S4 and S6 had crystallized, such that their XRD results shows multiple peak shapes, indicating the crystal structure. However, sample S5 did not crystallize at this time and was in the supercooled $N_{TB}$ phase state, such that no crystallization peak was observed in the XRD results. Samples S7 and S8 have the characteristics of stable non-crystallization, and XRD analysis was conducted on the same after being stored for 180 days. It can be seen that no crystallization peak appears, indicating that the sample is still in the supercooled $N_{TB}$ phase state at this time.

Figure 4:
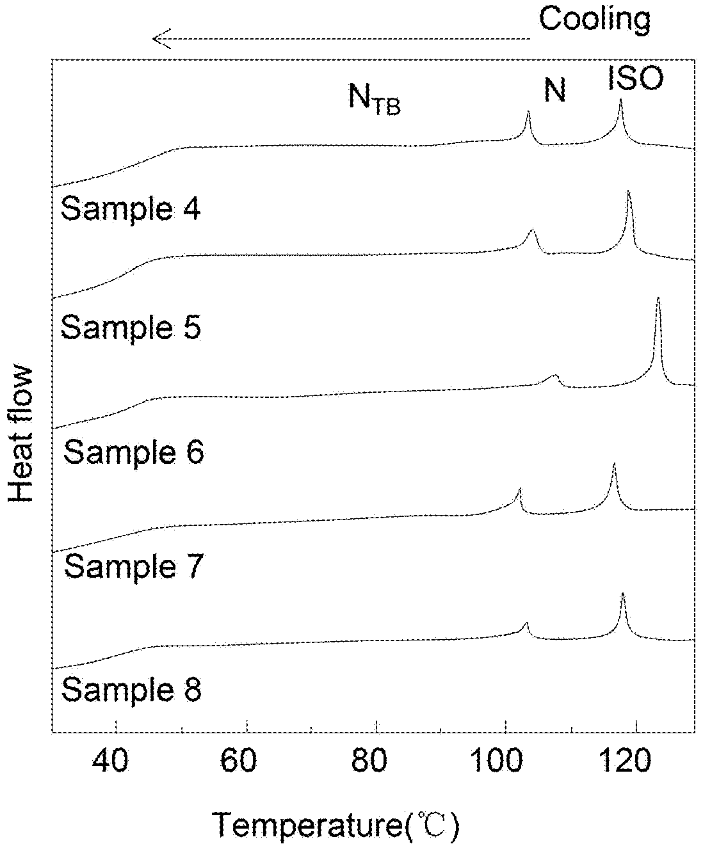
FIG. 4 shows a schematic diagram of the differential scanning calorimeter (DSC) analysis data of samples S4, S5, S6, S7, and S8 when cooling from 130° C. at 5° C./min.

The differential scanning calorimeter (DSC) analysis data results are shown in FIG. 4. FIG. 4 shows a schematic diagram of the DSC analysis data of samples S4, S5, S6, S7, and S8 when cooling from 130° C. at 5° C./min. Looking from right to left in the figure, these material systems show peaks at around 120° C. and 100° C., respectively. The appearance of peaks on the curve indicates that the material has undergone a phase transition. Therefore, during the cooling from high temperature, these samples transform from the isotropic state (Iso) to the nematic phase (N) at about 120° C., and to $N_{TB}$ phase state at about 100° C. No other peaks are found when the temperature continued to decrease to ambient temperature, thus indicating that the material was in the $N_{TB}$ phase state from about 100° C. below.

The comparative experimental results of the crystallization stability of the material systems prepared according to Examples 5 to 6 and Comparative Examples 7 to 19 are shown in Table 1:

The experimental steps for sample preparation and crystallization stability test were as follows: all the above samples were each stirred at 130° C. for 2 h and poured into a commercial LC test empty box. The LC empty box was composed of two pieces of transparent glass coated with ITO electrodes, with a size of 18×15 $mm^2$ and an internal spacing of 12 μm. The samples were then slowly cooled to ambient temperature of 25° C. at 5° C./min. In order to eliminate the potential energy inside the material, a square wave electric field signal with a voltage of 10 V and a frequency of 1 kHz was applied to the samples for 10 min. The samples were then stored in a constant-temperature-humidity chamber (25° C., 50%), and the crystallization of the samples was observed every day.

Figure 9A:
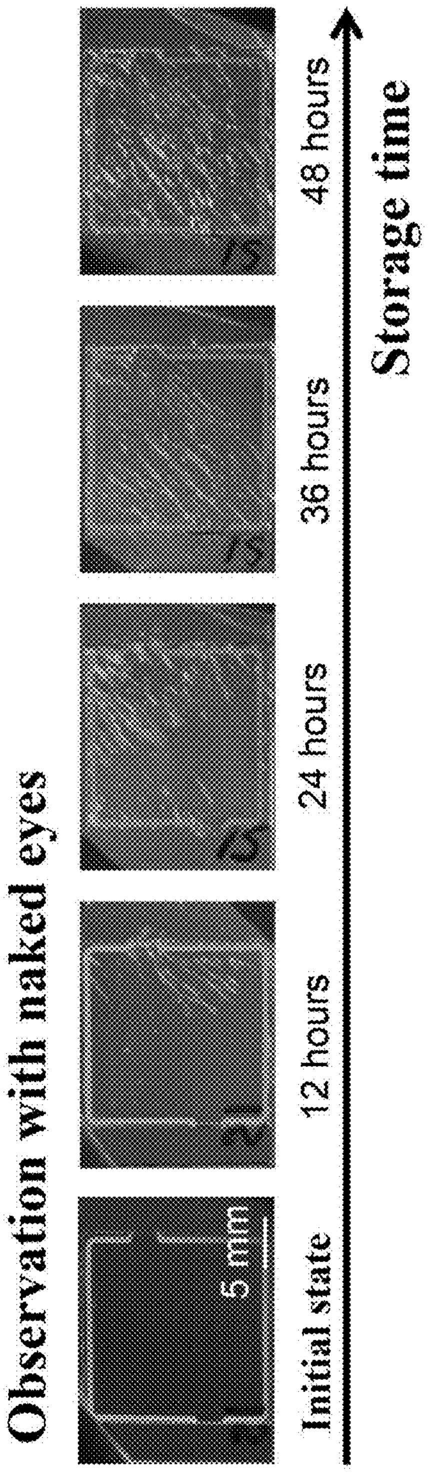
FIG. 9A shows results of the naked eye observation of a crystallization behavior of conventional unstable CH materials in Comparative Example 1.
Figure 9B:
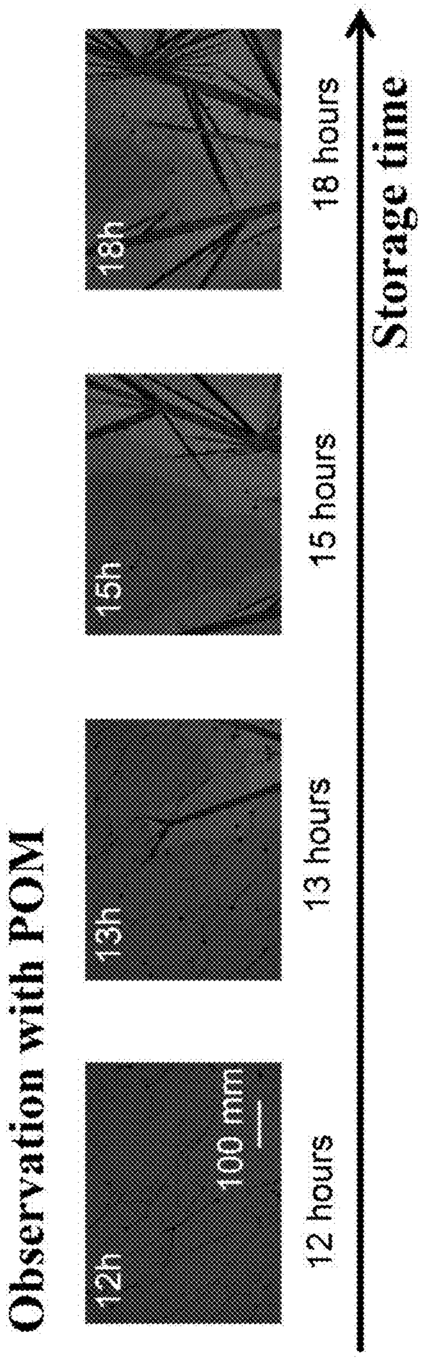
FIG. 9B shows results of the POM verification of a crystallization behavior of conventional unstable CH materials in Comparative Example 1.

The crystallization time of a sample is defined as a time interval from the completion of sample preparation to the moment when crystallization of the sample is first discovered. The crystallization of the sample could be roughly measured by visual observation and verified by POM. As shown in FIGS. 9A-9B, FIGS. 9A-9B shows results of naked eye observation and POM verification. The figure shows the photos of the crystallizing sample and the morphologies under POM, respectively. The uncrystallized areas exhibits a relatively uniform texture; once the sample begin to crystallize, distinct crystal structures are formed, such as the branch-like crystals shown in FIGS. 9A-9B.

TABLE 1

Comparative experimental results of crystallization stability of material systems prepared according to Examples 5 to 6 and Comparative Examples 7 to 19

| Group | | Sample No. | CBnCB material composition (CB7CB/CB9CB/CB11CB) | Crystallization time (day) |
|---|---|---|---|---|
| Single dimer | Comparative Example 7 | S-1 | 100/0/0 | <1 |
| | Comparative Example 8 | S-2 | 0/100/0 | <1 |
| | Comparative Example 9 | S-3 | 0/0/100 | 0 |
| Double dimers | Comparative Example 10 | D-1 | 80/20/0 | 4 |
| | Comparative Example 11 | D-2 | 80/0/20 | 4 |
| | Comparative Example 12 | D-3 | 0/80/20 | <1 |
| | Comparative Example 13 | D-4 | 0/20/80 | <1 |
| | Comparative Example 14 | D-5 | 20/0/80 | <1 |
| | Comparative Example 15 | D-6 | 60/40/0 | 20 |
| | Comparative Example 16 | D-7 | 60/0/40 | 13 |
| | Comparative Example 17 | D-8 | 0/60/40 | 10 |
| | Comparative Example 18 | D-9 | 0/40/60 | <1 |
| | Comparative Example 19 | D-10 | 40/60/0 | <1 |
| | Comparative Example 20 | D-11 | 40/0/60 | 9 |
| Triple dimers | Example 5 | T-1 | 60/20/20 | >400 |
| | Comparative Example 21 | T-2 | 20/60/20 | 38 |
| | Comparative Example 22 | T-3 | 20/20/60 | 4 |
| | Example 6 | T-4 | 40/40/20 | >400 |
| | Comparative Example 23 | T-5 | 40/20/40 | 200 |
| | Comparative Example 24 | T-6 | 20/40/40 | 120 |
| | Comparative Example 25 | T-12 | 80/10/10 | 5 |

As shown in Table 1, when the mass percentage of the nematic LC monomer 5CB reaches 52%, the material system exhibits a chiral nematic phase state at ambient temperature of 25° C. Depending on the composition and content of the LC dimer-based material CBnCB in the material systems, the material systems exhibit differentiated crystallization times. When the material ratio in the present disclosure is satisfied, the material system exhibits an ultra-stable crystallization stability.

It could be proved from the data in Table 1 that when the material system only includes a single LC dimer-based material CBnCB, such as Comparative Examples 7 to 9, the material system is extremely unstable and crystallization occurs after only a few hours (samples S-1, S-2, and S-3). When the material system includes two LC dimer-based materials CBnCB, the stability of the material system is improved, for example, Comparative Examples 10 to 20. The sample prepared in Comparative Example 15 has the best stability and could last for 20 days without crystallization. However, the crystallization stability of the system is closely related to the content of CBnCB, and most of the material components still have a poor stability. When the material system includes 3 kinds of LC dimer-based materials CBnCB, the stability of the material system is abnormally improved. Sample T-1 prepared according to Example 5 and sample T-4 prepared according to Example 6 do not crystallize for 400 days, showing a significantly enhanced stability. Comparative Examples 21, 22, and 25 crystallize on days 38, 4, and 5, respectively, which is due to the higher concentration of individual CBnCB in the system. This high concentration results in a material system with a stability close to that of a single dimer (such as sample S-1, S-2, and S-3), which was extremely unstable and prone to crystallization. Comparative Examples 23 and 24 crystallize on days 200 and 120, respectively, which might be due to the fact that the complex interactions between molecules are not enough to establish an optimal balance to prevent crystallization. As a result, the percentage content and ratio of the three LC dimer-based materials in the present disclosure are crucial to the crystallization behavior.

The improvement in crystallization stability is due to the interaction between a variety of LC dimer-based materials and is not limited to the nematic LC monomer materials they cooperated with. Even if the nematic LC monomer material 5CB in material sample T-1 is replaced with other nematic LC monomer materials, this strong crystallization stability remains unchanged. The specific results are shown in Table 2:

TABLE 2

Crystallization stability of LC-based CH materials prepared according to Examples 5 and 7 to 11

| | Sample No. | Nematic LC monomer material | CBnCB material | Crystallization time |
|---|---|---|---|---|
| Example 5 | T-1 | 5CB | CB7CB/CB9C | >400 days |
| Example 7 | T-7 | E7 | B/CB11CB | >400 days |
| Example 8 | T-8 | TEB300 | (60/20/20) | >400 days |
| Example 9 | T-9 | SLC1717 | | >400 days |
| Example 10 | T-10 | HTD028200-200 | | >400 days |
| Example 11 | T-11 | SLC9023 | | >400 days |

Figure 5A:
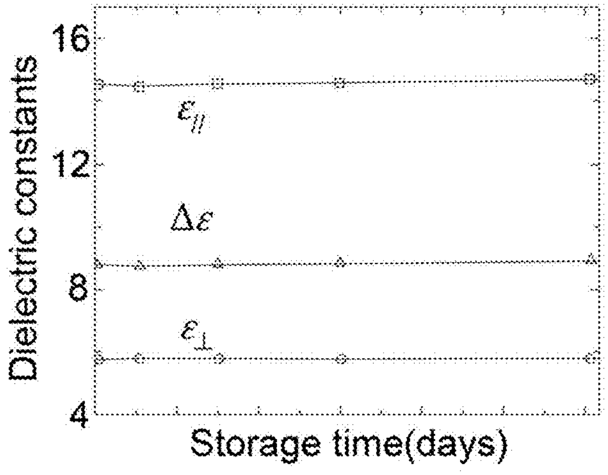
FIG. 5A shows dielectric constants tested at different time stages of the ambient-temperature stable non-crystalline $N_{TB}$ LC dimer-based material in an embodiment of the present disclosure during storage for 1 year.
Figure 5B:
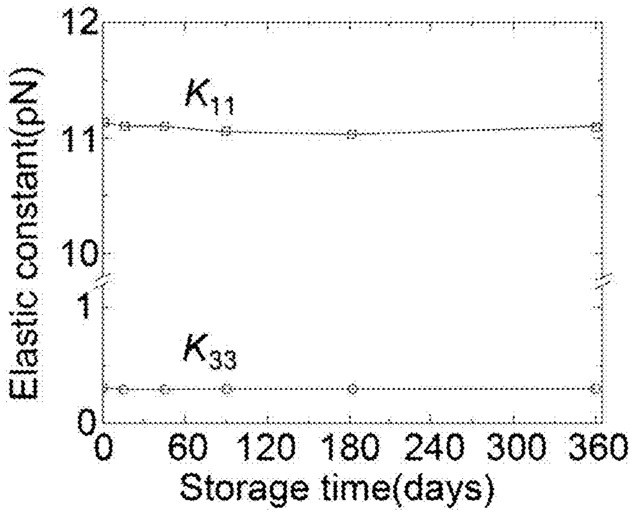
FIG. 5B shows elastic parameters tested at different time stages of the ambient-temperature stable non-crystalline $N_{TB}$ LC dimer-based material in an embodiment of the present disclosure during storage for 1 year.

In the present disclosure, the ambient-temperature stable non-crystalline LC-based CH material has an ultra-high crystallization stability and a long-term stability of physical parameters. Sample T-1 prepared according to Example 5 was filled into a commercial LC box (size: 15*18 $mm^2$, thickness 12 μm) containing an ITO electrode, to determine dielectric constants (a parallel dielectric constant ε//, a perpendicular dielectric constant ci, and a relative dielectric constant Δε), a splay elastic parameter $K_{11}$, and a bending elastic parameter $K_{33}$ by a capacitance-voltage method. In this method, the LC was induced from a planar arrangement to a vertical arrangement by applying an AC signal with a frequency of 1 kHz. A capacitance of the sample was monitored as a function of the applied voltage, which was varied from 0.1 V to 8.5 V with intervals of 30 s. According to the theoretical fitting test of the dependence of capacitance on voltage, a relative dielectric constant and elastic parameters could be extracted. The dielectric constant and elastic parameters were tested using a commercial LC comprehensive parameter tester (ALCT-IV1, INSTEC, USA). The results are shown in FIGS. 5A-5B. FIGS. 5A-5B show dielectric constants and elastic parameters tested at different time stages of the ambient-temperature stable non-crystalline $N_{TB}$ LC dimer-based material in the present disclosure during storage for 1 year. The material system has ε// and ε⊥ of about 14.6 and 5.7, respectively, and a relative dielectric constant Δε of about 8.9, and behaves as a positive LC; and the molecules are arranged along an electric field under the electric field, satisfying one of construction conditions of the CH structure. The material system has a $K_{11}$ of approximately 11.0 pN. The most important thing is that the material system prepared according to the present disclosure met an ultra-low bending elastic constant at ambient temperature, $K_{33}$=0.3 pN. This ultra-low bending elastic constant is a necessary condition for constructing a CH structure, and plays a key role in the wide dynamic range modulation performance of the reflected color of the subsequent CH structure. Moreover, even after being stored for one year, the measured physical parameters of the material system show almost no significant changes, further confirming the ultra-high stability of the material system.

Figure 6:
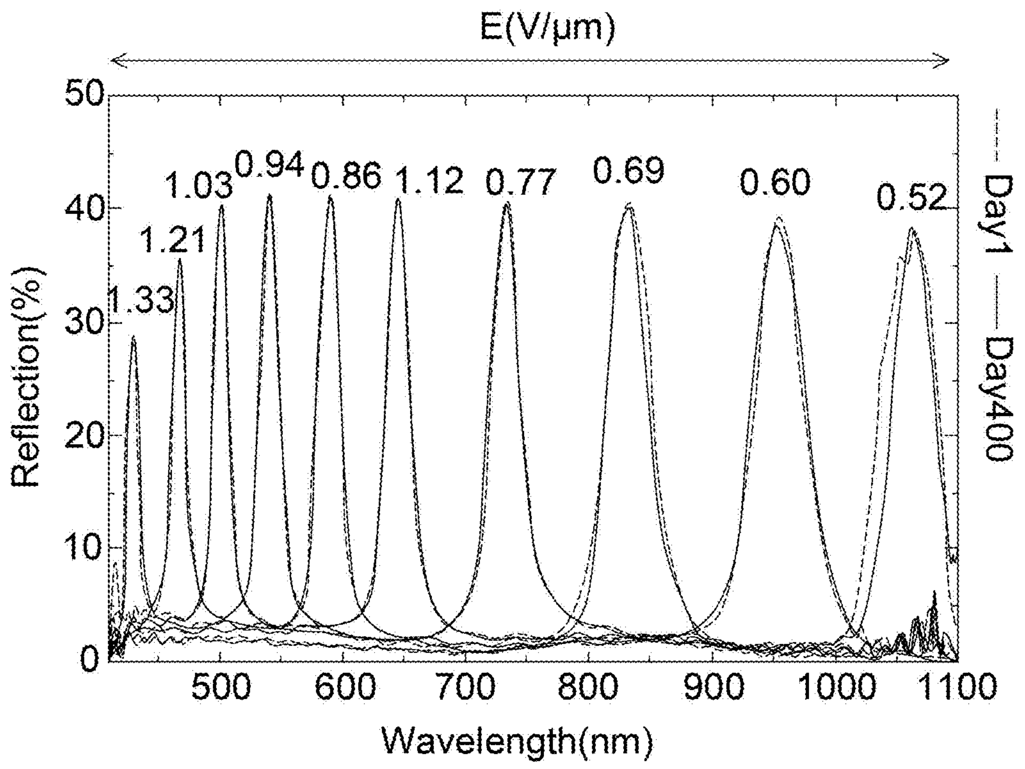
FIG. 6 shows a reflection spectrum driven by an electric field for a sample T-1 of the ambient-temperature stable non-crystalline LC-based CH material in an embodiment of the present disclosure during a one-year storage period.

Furthermore, in order to verify the stability of sample T-1 of the ambient-temperature stable non-crystalline LC-based CH material of the present disclosure, the electric field-driven reflection band modulation performance of the CH structure constructed by the same was analyzed. The reflection spectrum of sample T-1 during a one-year storage period was tested with electric field driving, and the results are shown in FIG. 6. FIG. 6 shows a reflection spectrum driven by an electric field for sample T-1 of the ambient-temperature stable non-crystalline LC-based CH material in the present disclosure during a one-year storage period. The CH structure was constructed by applying an external electric field. As an external electric field intensity increased from 0.52 V/m to 1.33 V/m, a pitch P and an oblique angle θ of the CH structure were compressed. This was accompanied by a sequential change in reflection color to bright red, orange, green, cyan, and dark blue, corresponding to a blue shift in the reflection spectrum of the CH structure. The reflection spectrum could be reversibly and repeatedly operated over a wide spectral range from 450 nm to 1,050 nm. Even after a storage and testing period of over 1 year, the sample still did not crystallize. What was even more encouraging is that the reflection spectrum corresponding to the corresponding electric field intensity does not show obvious changes, confirming that the CH structure of the present disclosure has a strong stability.

Figure 7:
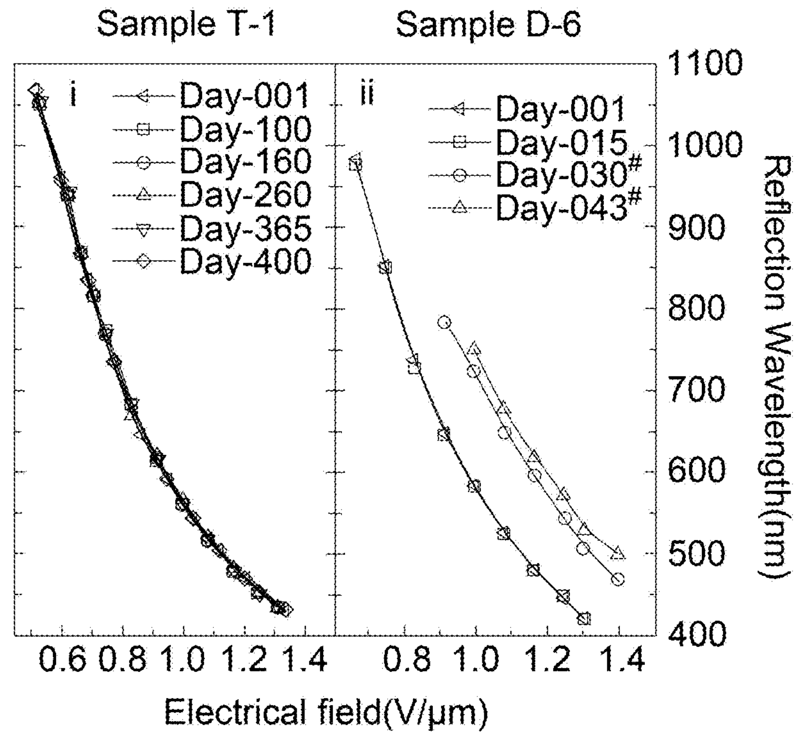
FIG. 7 shows electric field-driven reflection bands of CH material systems separately constructed with the sample T-1 of the ambient-temperature stable non-crystalline LC-based CH material in the present disclosure and a sample D-6 prepared in Comparative Example 9.

As a comparison, the electric field-driven reflection band of a CH structure constructed with an unstable material system (such as sample D-6 prepared according to Comparative Example 15) was tested. The results are shown in FIG. 7. FIG. 7 shows electric field-driven reflection bands of CH material systems separately constructed with the sample T-1 of the ambient-temperature stable non-crystalline LC-based CH material in the present disclosure and a sample D-6 prepared according to Comparative Example 15. It can be seen from the figure that sample T-1 of the ambient-temperature stable non-crystalline LC-based CH material of the present disclosure does not have any crystallization even if it is stored for 400 days. Moreover, no matter when the sample is tested for the modulation of the reflection band corresponding to the electric field at any time point during the storage period, the results show that there is no significant change in either the corresponding relationship between the electric field and the position of the reflection band or the overall modulated spectral range. For comparison, the unstable sample D-6 prepared according to Comparative Example 15 begins to crystallize on the 20th day. Once crystallizing, the reflection band modulation performance corresponding to the electric field of the sample rapidly deteriorates. This is specifically manifested as a shift in the electric field-reflection band position of the sample and a reduction in the overall reflection spectrum modulation range. This is due to the fact that after the LC dimer-based material in the material system crystallizes and precipitates, the bending elastic properties of the material system gradually deteriorate.

In the present disclosure, the ambient-temperature stable non-crystalline LC-based CH material could form an LC-based CH structure. This structure is a special helical structure formed under the driving of electric field. The reflection spectrum corresponding to the structure driven by an electric field changes with the intensity of the electric field, showing a wide dynamic range (450 nm to 1,050 nm) of tunability in the reflection spectrum. Therefore, the existence of the LC-based CH structure is confirmed from the reflection spectrum data in FIG. 6 and FIG. 7.

Figure 8A:
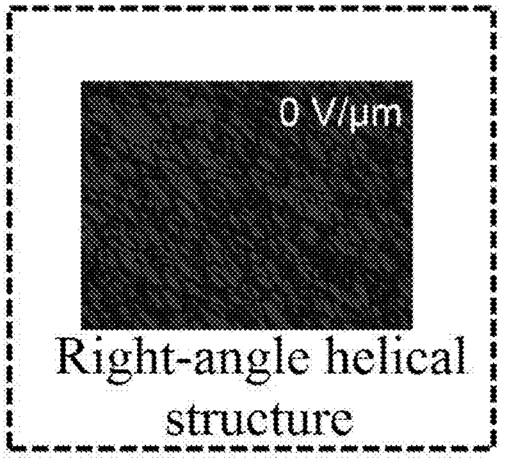
FIG. 8A shows polarized optical microscope (POM) display results of the ambient-temperature stable non-crystalline LC-based CH material in an embodiment of the present disclosure without any electric field.
Figure 8B:
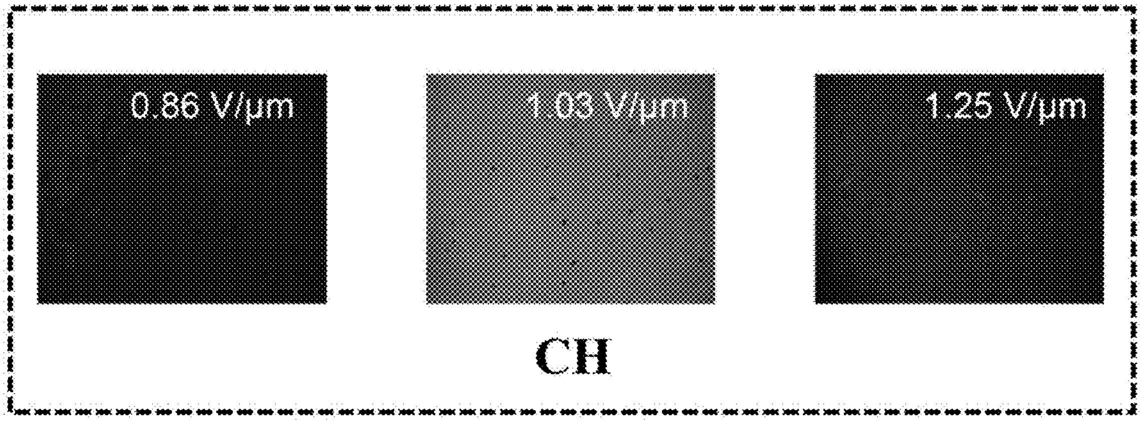
FIG. 8B shows polarized optical microscope (POM) display results of the ambient-temperature stable non-crystalline LC-based CH material in an embodiment of the present disclosure with different electric fields.

To further illustrate the above issues, the following POM data is provided, and the results are shown in FIGS. 8A-8B. FIGS. 8A-8B show POM display results of the ambient-temperature stable non-crystalline LC-based CH material in the present disclosure. In the ambient-temperature stable non-crystalline LC-based CH material of the present disclosure, when no electric field is applied, the material system exhibits a traditional planar heliconical structure of cholesteric LC, with almost no obvious specific reflection spectrum information; when an electric field is applied, the material system converts from the right-angle helical structure to the CH structure. Moreover, for different electric field intensities, the CH structure corresponds to changes in the pitch and oblique angle of the structure, thereby showing a specific reflection color (red-green-blue) and a specific reflection spectrum position.

Although the embodiments of the present disclosure have been shown and described, and the present disclosure has been described in detail, these are only some, but not all, of the embodiments of the present disclosure. It will be understood by those of ordinary skill in the art that various changes, modifications, substitutions, and variations can be made to these embodiments without departing from the principles and spirit of the present disclosure. Other embodiments can be obtained without inventive step, and all belong to the scope of the present disclosure. The scope of the present disclosure is defined by the appended claims and their equivalents.

What is claimed is:

1. An ambient-temperature stable non-crystalline twist-bend nematic ($N_{TB}$) liquid crystal (LC) material, consisting of the following components by mass percentage: 30% to 60% of CB7CB, 15% to 45% of CB9CB, and 15% to 25% of CB11CB; wherein the CB7CB has a structure as follows:

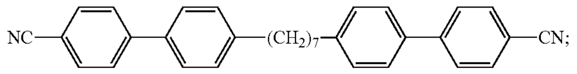

the CB9CB has a structure as follows:

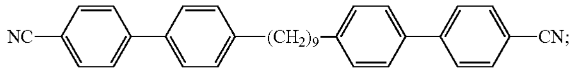

and the CB11CB has a structure as follows:

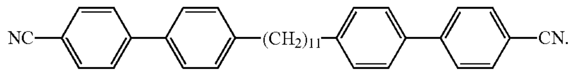

2. The ambient-temperature stable non-crystalline $N_{TB}$ LC material of claim 1, consisting of the following components by mass percentage: 40% to 60% of the CB7CB, 20% to 40% of the CB9CB, and 15% to 20% of the CB11CB.

3. The ambient-temperature stable non-crystalline $N_{TB}$ LC material of claim 1, consisting of the following components by mass percentage: 60% of the CB7CB, 20% of the CB9CB, and 20% of the CB11CB; alternatively, consisting of the following components by mass percentage: 40% of the CB7CB, 40% of the CB9CB, and 20% of the CB11CB.

4. The ambient-temperature stable non-crystalline $N_{TB}$ LC material of claim 2, consisting of the following components by mass percentage: 50% of the CB7CB, 35% of the CB9CB, and 15% of the CB11CB; alternatively, consisting of the following components by mass percentage: 55% of the CB7CB, 30% of the CB9CB, and 15% of the CB11CB.

5. An ambient-temperature stable non-crystalline LC cholesteric heliconical (CH) material, consisting of the following components by mass percentage: 45% to 55% of an ambient-temperature stable non-crystalline $N_{TB}$ LC material, 40% to 52% of a nematic LC monomer material, and 0.1% to 10% of a chiral molecule; wherein the ambient-temperature stable non-crystalline $N_{TB}$ LC material consists of the following components by mass percentage: 30% to 60% of CB7CB, 15% to 45% of CB9CB, and 15% to 25% of CB11CB; wherein the CB7CB has a structure as follows:

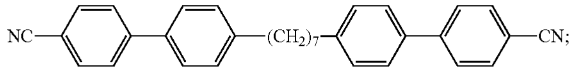

the CB9CB has a structure as follows:

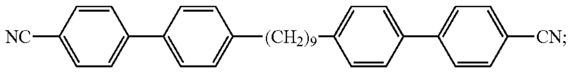

and the CB11CB has a structure as follows:

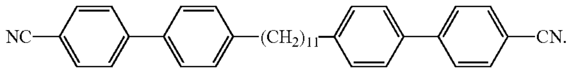

6. The ambient-temperature stable non-crystalline LC CH material of claim 5, wherein the nematic LC monomer material is selected from the group consisting of 5CB, 8CB, and 7OCB, having structures as follows

5CB

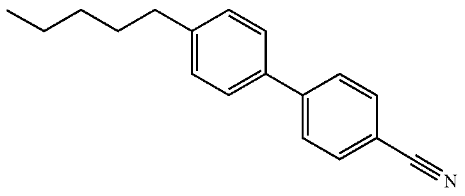

8CB

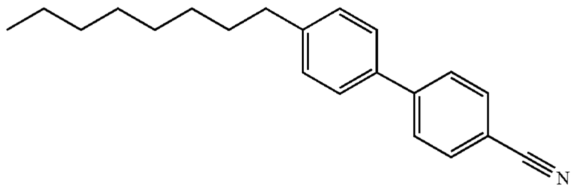

7OCB

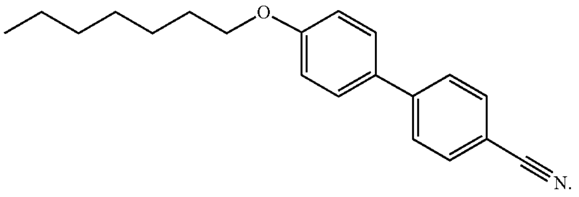

7. The ambient-temperature stable non-crystalline LC CH material of claim 5, wherein the chiral molecule is selected from the group consisting of CB15, R811, S811, R2011, S2011, R1011, S1011, R5011, and S5011, having structures as follows

CB15

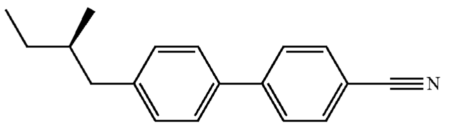

CB15

-continued
R811
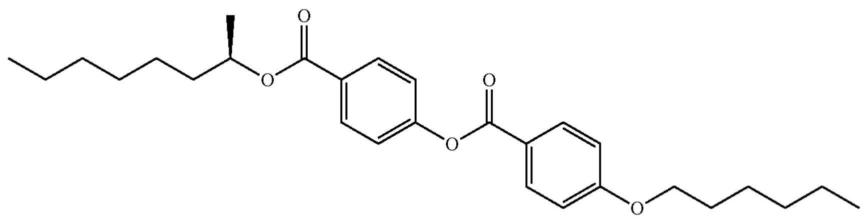
S811
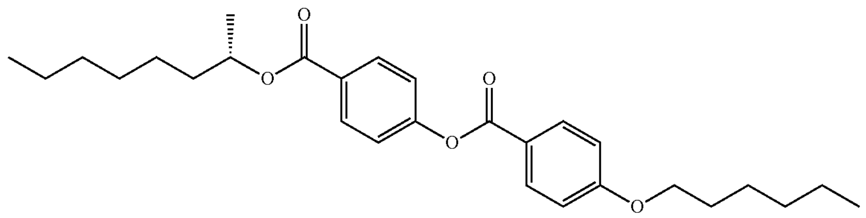
R2011
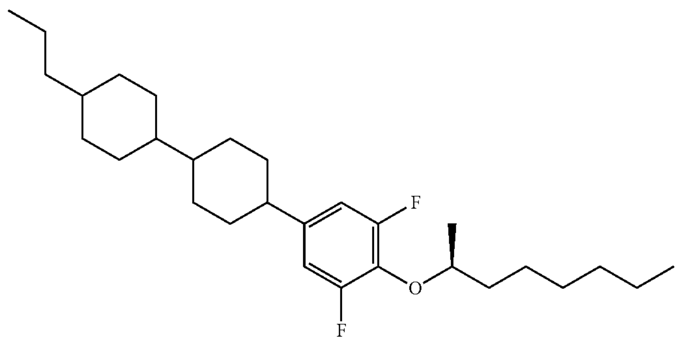
S2011
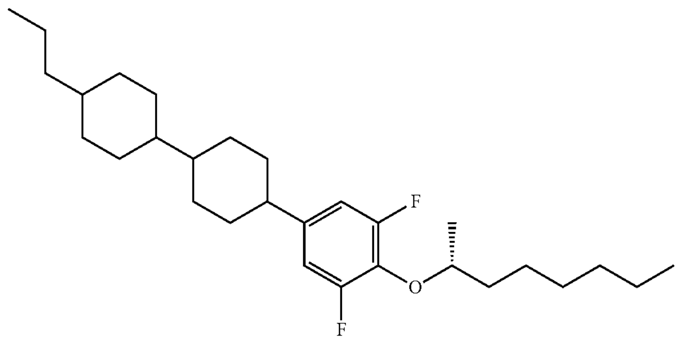
R1011
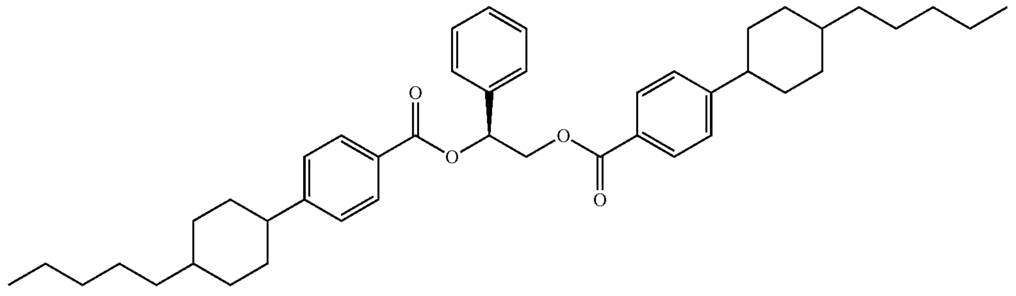

-continued

S1011

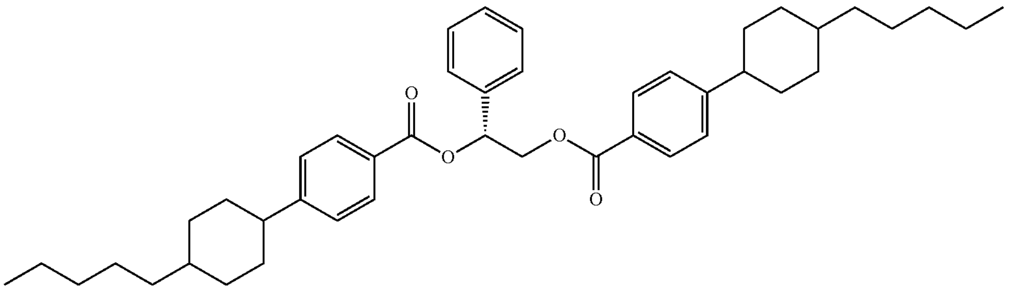

R5011

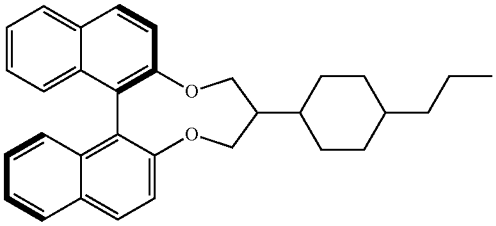

S5011

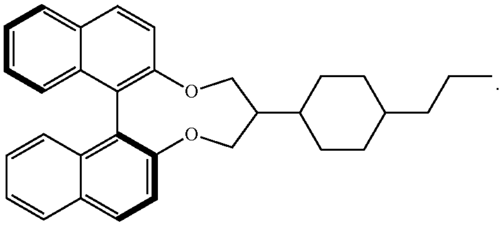

8. The ambient-temperature stable non-crystalline LC CH material of claim 5, consisting of the following components by mass percentage: 45% to 50% of the ambient-temperature stable non-crystalline $N_{TB}$ LC material, 45% to 52% of the nematic LC monomer material, and 1% to 5% of the chiral molecule.

9. The ambient-temperature stable non-crystalline LC CH material of claim 8, consisting of the following components by mass percentage: 45% of the ambient-temperature stable non-crystalline $N_{TB}$ LC material, 52% of the nematic LC monomer material, and 3% of the chiral molecule.

10. The ambient-temperature stable non-crystalline LC CH material of claim 8, wherein the ambient-temperature stable non-crystalline $N_{TB}$ LC material consists of the following components by mass percentage: 40% to 60% of the CB7CB, 20% to 40% of the CB9CB, and 15% to 20% of the CB11CB.

11. The ambient-temperature stable non-crystalline LC CH material of claim 10, wherein the ambient-temperature stable non-crystalline $N_{TB}$ LC material consists of the following components by mass percentage: 60% of the CB7CB, 20% of the CB9CB, and 20% of the CB11CB, alternatively, consists of the following components by mass percentage: 40% of the CB7CB, 40% of the CB9CB, and 20% of the CB11CB.

12. The ambient-temperature stable non-crystalline LC CH material of claim 10, wherein the ambient-temperature stable non-crystalline $N_{TB}$ LC material consists of the following components by mass percentage: 50% of the CB7CB, 35% of the CB9CB, and 15% of the CB11CB, alternatively, consists of the following components by mass percentage: 55% of the CB7CB, 30% of the CB9CB, and 15% of the CB11CB.

13. A display panel or a display device, comprising the ambient-temperature stable non-crystalline LC CH material of claim 5.

14. The display panel or a display device of claim 13, wherein the nematic LC monomer material is selected from the group consisting of 5CB, 8CB, and 7OCB, and the chiral molecule is selected from the group consisting of CB15, R811, S811, R2011, S2011, R1011, S1011, R5011, and S5011,

5CB

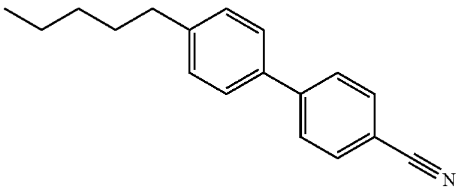

8CB

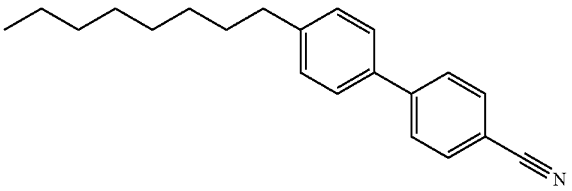

7OCB

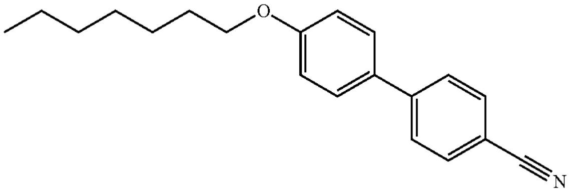

CB15

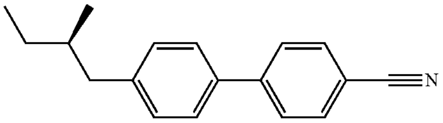

-continued
R811
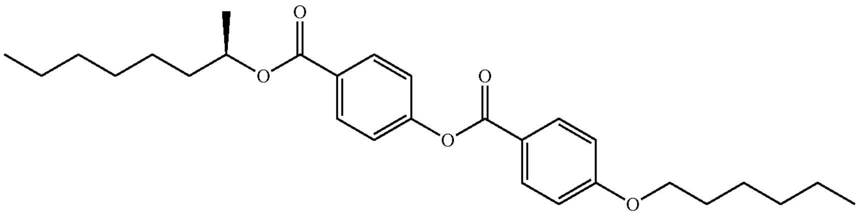
S811
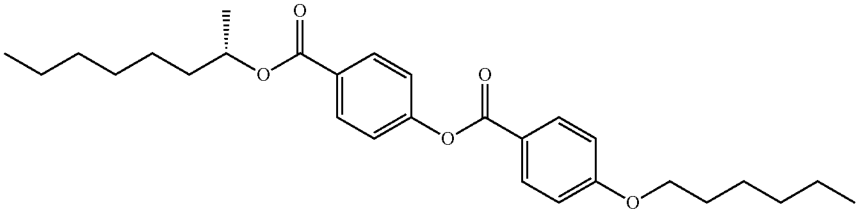
R2011
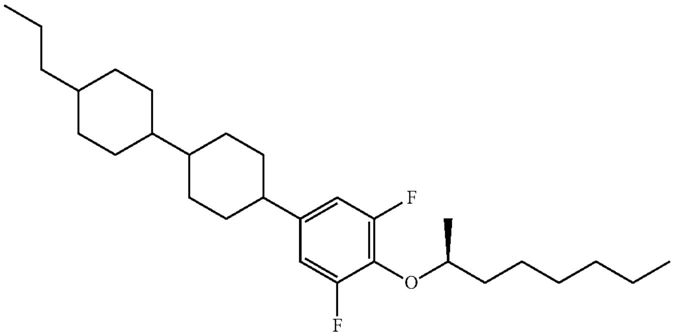
S2011
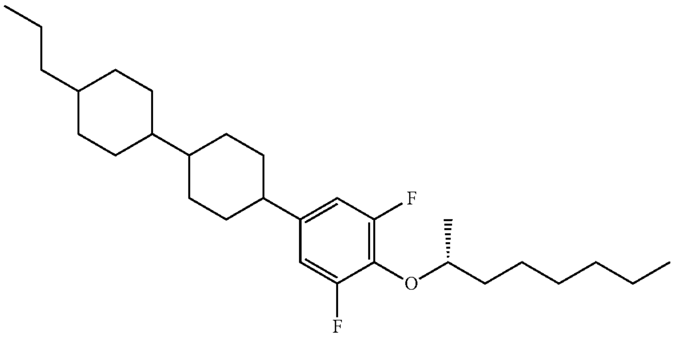
R1011
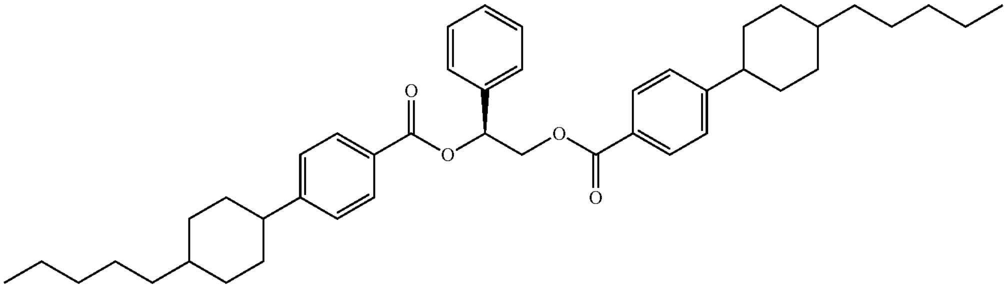

-continued

S1011

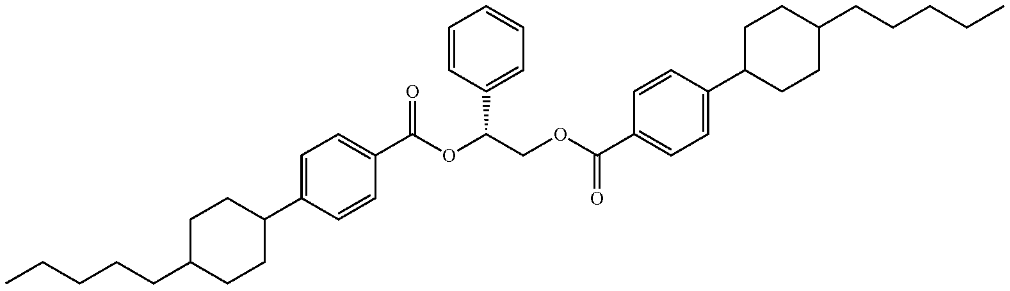

R5011

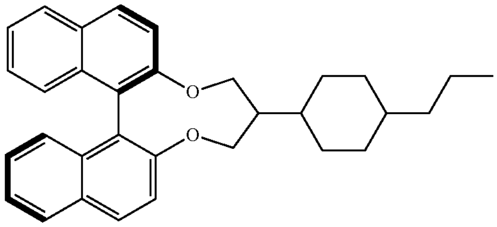

S5011

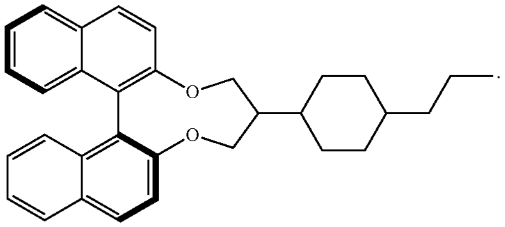

15. The display panel or a display device of claim 13, wherein the ambient-temperature stable non-crystalline LC CH material consists of the following components by mass percentage: 45% to 50% of the ambient-temperature stable non-crystalline $N_{TB}$ LC material, 45% to 52% of the nematic LC monomer material, and 1% to 5% of the chiral molecule.

16. The display panel or a display device of claim 15, wherein the ambient-temperature stable non-crystalline LC CH material consists of the following components by mass percentage: 45% of the ambient-temperature stable non-crystalline $N_{TB}$ LC material, 52% of the nematic LC monomer material, and 3% of the chiral molecule.

17. The display panel or a display device of claim 15, wherein the ambient-temperature stable non-crystalline $N_{TB}$ LC material consists of the following components by mass percentage: 40% to 60% of the CB7CB, 20% to 40% of the CB9CB, and 15% to 20% of the CB11CB.

18. The display panel or a display device of claim 17, wherein the ambient-temperature stable non-crystalline $N_{TB}$ LC material consists of the following components by mass percentage: 60% of the CB7CB, 20% of the CB9CB, and 20% of the CB11CB; or the ambient-temperature stable non-crystalline $N_{TB}$ LC material consists of the following components by mass percentage: 40% of the CB7CB, 40% of the CB9CB, and 20% of the CB11CB; or the ambient-temperature stable non-crystalline $N_{TB}$ LC material consists of the following components by mass percentage: 50% of the CB7CB, 35% of the CB9CB, and 15% of the CB11CB; or the ambient-temperature stable non-crystalline $N_{TB}$ LC material consists of the following components by mass percentage: 55% of the CB7CB, 30% of the CB9CB, and 15% of the CB11CB.

* * * * *